US012157243B2

(12) United States Patent
Glass et al.

(10) Patent No.: US 12,157,243 B2
(45) Date of Patent: Dec. 3, 2024

(54) PERFORATING APPARATUS AND METHOD FOR MANUFACTURING A SHAPED LINE OF WEAKNESS

(71) Applicant: The Procter & Gamble Company, Cincinnati, OH (US)

(72) Inventors: Katie Kristine Glass, Maineville, OH (US); Zachary Aaron Freije, Ashville, NC (US); Matthew Travis Brightman, Newport, KY (US); Nicholas Raymond Tenhundfeld, Hyde Park, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/473,647

(22) Filed: Sep. 25, 2023

(65) Prior Publication Data

US 2024/0009880 A1 Jan. 11, 2024

Related U.S. Application Data

(63) Continuation of application No. 16/124,621, filed on Sep. 7, 2018, now Pat. No. 11,806,890.

(Continued)

(51) Int. Cl.
*B26D 1/62* (2006.01)
*B26D 1/38* (2006.01)
(Continued)

(52) U.S. Cl.
CPC ................ *B26F 1/10* (2013.01); *B26D 1/385* (2013.01); *B26D 1/626* (2013.01); *B26D 7/1854* (2013.01); *B26D 7/1863* (2013.01)

(58) Field of Classification Search
CPC ........... B26F 1/10; B26D 1/385; B26D 1/626; B26D 1/62; B26D 7/1854; B26D 7/1863
(Continued)

(56) References Cited

U.S. PATENT DOCUMENTS

D17,308 S 5/1887 Kelsey
405,412 A 6/1889 Hicks
(Continued)

FOREIGN PATENT DOCUMENTS

CA 2373812 A1 1/2001
CA 2408404 A1 11/2001
(Continued)

OTHER PUBLICATIONS

All Office Actions, U.S. Appl. No. 17/235,238, filed Apr. 20, 2021.
(Continued)

*Primary Examiner* — Nhat Chieu Q Do
(74) *Attorney, Agent, or Firm* — Richard L. Alexander; Sarah M. Decristofaro

(57) ABSTRACT

A perforating apparatus and method includes a longitudinal cylinder axis about which a cylinder rotates. At least one shaped anvil bead is disposed on the cylinder. The cylinder including an anvil block and an anvil bead form a cavity. The cavity may be used to control the debris produced during the perforating process. A blade is disposed on a support to cooperate in contacting relationship with the anvil bead. A web is perforated as the web passes between the rotating cylinder and the support and the blade operatively engages with the anvil bead. The debris may be controlled by being drawn into the cavity prior to the point where the blade engages the anvil and, subsequently, being expelled after the point where the blade engages the anvil bead.

12 Claims, 13 Drawing Sheets

Related U.S. Application Data

(60) Provisional application No. 62/556,633, filed on Sep. 11, 2017.

(51) Int. Cl.
*B26D 7/18* (2006.01)
*B26F 1/10* (2006.01)

(58) Field of Classification Search
USPC ........................................ 83/100, 37
See application file for complete search history.

(56) References Cited

U.S. PATENT DOCUMENTS 714,652 A 11/1902 Davis
1,383,868 A 7/1921 Smith
2,007,544 A 7/1935 Meisel
2,007,731 A 7/1935 Tomlin
2,328,109 A 8/1943 Thompson
2,530,319 A 11/1950 Young
2,588,581 A 3/1952 Sieger
2,744,624 A 5/1956 Hoogstoel et al.
2,805,715 A 9/1957 Abraham
3,190,163 A 6/1965 Bradley
3,228,274 A 1/1966 George
3,264,921 A 8/1966 Daniel
3,321,145 A 5/1967 Gorman
3,323,269 A 6/1967 Donald
3,467,250 A 9/1969 Elia et al.
3,503,834 A 3/1970 Schroter
3,583,558 A 6/1971 Davis
3,716,132 A 2/1973 Lewyckyj
3,733,949 A 5/1973 Bradley
3,752,304 A 8/1973 Alef
3,762,542 A 10/1973 Grimes
3,769,868 A 11/1973 Hornung
3,770,172 A 11/1973 Nystrand et al.
3,779,123 A 12/1973 Chafee
3,931,886 A 1/1976 Yamauchi
4,026,077 A 5/1977 Pickett
4,034,637 A 7/1977 Ollery
4,044,641 A 8/1977 Burt, Jr. et al.
4,164,329 A 8/1979 Higby
4,199,090 A 4/1980 Reed
4,210,688 A 7/1980 Sato
4,244,251 A 1/1981 Iwao et al.
4,452,114 A 6/1984 Rynik et al.
4,457,964 A 7/1984 Kaminstein
4,610,189 A 9/1986 Lombardo
4,747,364 A 5/1988 Horowitz
4,759,247 A 7/1988 Bell et al.
4,884,719 A 12/1989 Levine et al.
5,041,317 A 8/1991 Greyvenstein
5,048,387 A 9/1991 Niitsuma et al.
5,114,771 A 5/1992 Ogg et al.
5,117,718 A 6/1992 Wittkopf
5,125,302 A 6/1992 Biagiotti
5,205,454 A 4/1993 Schutz et al.
5,246,110 A 9/1993 Greyvenstein
5,284,304 A 2/1994 Biagiotti
5,344,091 A 9/1994 Molison
5,445,054 A * 8/1995 Pryor .................... B26D 1/365 83/333
5,453,311 A 9/1995 Svensson
D175,829 S 10/1995 Fitzpatrick
D368,775 S 4/1996 Gobran
5,562,964 A 10/1996 Jones
5,613,347 A 3/1997 Weder
5,616,387 A 4/1997 Augst et al.
D382,911 S 8/1997 Magner et al.
D385,910 S 11/1997 Hansen
5,704,566 A 1/1998 Schutz et al.
5,740,657 A 4/1998 Weder
5,740,658 A 4/1998 Weder
D393,950 S 5/1998 Lockhart
5,755,654 A 5/1998 Schulz et al.
5,789,050 A 8/1998 Kang
5,797,305 A 8/1998 Harrod et al.
5,806,399 A 9/1998 Oechsner
5,853,117 A 12/1998 Traise
D405,466 S 2/1999 Hansen
D410,950 S 6/1999 Kraus et al.
D413,351 S 8/1999 Escobedo et al.
D414,510 S 9/1999 Kraus et al.
D414,813 S 10/1999 Browning
6,029,921 A 2/2000 Johnson
D427,677 S 7/2000 Bruemmer-Prestley
D428,143 S 7/2000 Schmoker
6,092,354 A 7/2000 Takahashi
6,139,186 A 10/2000 Fraser
6,228,454 B1 5/2001 Johnson et al.
6,276,032 B1 8/2001 Nortman et al.
6,336,307 B1 1/2002 Oconnor
D456,837 S 5/2002 Leon
D457,913 S 5/2002 Leon
6,431,491 B1 8/2002 Biagiotti
6,447,864 B2 9/2002 Johnson et al.
6,460,727 B1 10/2002 Irwin
6,464,120 B1 10/2002 Johnson et al.
D466,152 S 11/2002 Leon
6,536,624 B2 3/2003 Johnson et al.
6,565,794 B1 5/2003 Fraser
D483,120 S 12/2003 Klebba et al.
D483,486 S 12/2003 Klebba et al.
D483,867 S 12/2003 Klebba et al.
6,694,535 B1 2/2004 Gianesi
6,698,323 B2 3/2004 Formon et al.
D489,450 S 5/2004 Wu et al.
6,838,040 B2 1/2005 Mlinar et al.
6,877,689 B2 4/2005 Butterworth
D527,102 S 8/2006 Mills et al.
D527,818 S 9/2006 Mills et al.
7,195,810 B1 3/2007 Schmidt et al.
D544,960 S 6/2007 Schroer, Jr.
D550,367 S 9/2007 Nash
D560,070 S 1/2008 Fujimoto et al.
D562,461 S 2/2008 Nash
D573,763 S 7/2008 Policicchio et al.
D589,264 S 3/2009 Hanafusa
D599,013 S 8/2009 Johnson et al.
D616,541 S 5/2010 Mason, Jr.
7,707,661 B2 5/2010 Issachar
7,971,514 B2 7/2011 Alalu
7,988,607 B2 8/2011 Baggot et al.
8,166,857 B2 5/2012 Powell et al.
8,268,429 B2 9/2012 McNeil et al.
8,277,917 B2 10/2012 Neto et al.
8,283,013 B2 10/2012 Feldmann et al.
8,287,976 B2 10/2012 Hupp
8,287,977 B2 10/2012 Mcneil et al.
8,312,797 B2 11/2012 Hsu
8,353,236 B2 1/2013 De Marco et al.
8,443,725 B2 5/2013 Mcneil et al.
8,448,816 B2 5/2013 Gordon
8,468,938 B2 6/2013 Redd
8,535,483 B2 9/2013 Mellin et al.
8,539,867 B2 9/2013 Powell et al.
8,621,966 B2 1/2014 Germaine et al.
8,757,058 B2 6/2014 Kien et al.
8,763,523 B2 7/2014 Mcneil et al.
8,763,526 B2 7/2014 Mcneil et al.
8,802,211 B2 8/2014 Cattacin et al.
8,947,626 B2 2/2015 Iwamoto
9,195,861 B2 11/2015 Bigari et al.
9,259,848 B2 2/2016 Hupp et al.
D751,698 S 3/2016 Dobrin
9,409,372 B2 8/2016 Hada et al.
9,486,932 B2 11/2016 Baggot et al.
9,539,735 B2 1/2017 Ferguson
9,592,621 B2 3/2017 Demarco et al.
9,914,234 B2 3/2018 Baggot et al.
9,918,595 B2 3/2018 Olson et al.
9,918,596 B2 3/2018 Olson et al.
9,950,892 B2 4/2018 Slovut et al.

(56) References Cited

U.S. PATENT DOCUMENTS

| | | | |
|---|---|---|---|
| D817,009 | S | 5/2018 | Nelson et al. |
| D819,983 | S | 6/2018 | Barran et al. |
| 10,005,197 | B2 | 6/2018 | Kien et al. |
| 10,188,242 | B2 | 1/2019 | Olson et al. |
| 10,232,524 | B2 | 3/2019 | Slovut et al. |
| 10,293,510 | B2 | 5/2019 | Slovut et al. |
| D859,005 | S | 9/2019 | Schuh et al. |
| 10,524,622 | B2 | 1/2020 | Olson et al. |
| D876,109 | S | 2/2020 | Hood |
| D895,731 | S | 9/2020 | Schwab et al. |
| 10,814,513 | B2 | 10/2020 | Kien et al. |
| 10,857,690 | B2 | 12/2020 | Schwamberger et al. |
| 10,919,168 | B2 | 2/2021 | Slovut et al. |
| 10,947,671 | B2 | 3/2021 | Glass et al. |
| 10,960,566 | B2 | 3/2021 | Slovut et al. |
| 11,008,709 | B2 | 5/2021 | Glass et al. |
| 11,008,710 | B2 | 5/2021 | Glass et al. |
| 11,180,892 | B2 | 11/2021 | Glass et al. |
| 11,268,243 | B2 | 3/2022 | Glass et al. |
| 11,668,051 | B2 | 6/2023 | Glass et al. |
| 11,806,889 | B2 | 11/2023 | Glass et al. |
| 11,806,890 | B2 | 11/2023 | Glass et al. |
| 2001/0000737 | A1 | 5/2001 | Johnson et al. |
| 2002/0062117 | A1 | 5/2002 | Raufman |
| 2002/0155246 | A1 | 10/2002 | Johnson et al. |
| 2003/0000357 | A1 | 1/2003 | Tanaka |
| 2003/0033914 | A1 | 2/2003 | Mutchnik et al. |
| 2003/0106405 | A1 | 6/2003 | Hartmann et al. |
| 2003/0132549 | A1 | 7/2003 | Mlinar et al. |
| 2003/0172785 | A1 | 9/2003 | Formon et al. |
| 2003/0218040 | A1 | 11/2003 | Faulks et al. |
| 2003/0226431 | A1 | 12/2003 | Motard |
| 2004/0003699 | A1 | 1/2004 | Welch |
| 2004/0064911 | A1 | 4/2004 | Klupfel et al. |
| 2004/0159693 | A1 | 8/2004 | Adachi et al. |
| 2004/0182213 | A1 | 9/2004 | Wagner et al. |
| 2004/0188556 | A1 | 9/2004 | Jong |
| 2004/0244556 | A1 | 12/2004 | Neal |
| 2005/0100715 | A1 | 5/2005 | Bredahl et al. |
| 2005/0115372 | A1 | 6/2005 | Cavlin |
| 2005/0155478 | A1 | 7/2005 | Zimmer |
| 2006/0011030 | A1 | 1/2006 | Wagner et al. |
| 2007/0000364 | A1 | 1/2007 | Powell et al. |
| 2007/0014961 | A1 | 1/2007 | Schneider et al. |
| 2007/0023135 | A1 | 2/2007 | Giacometti |
| 2007/0044613 | A1 | 3/2007 | Cohn |
| 2007/0144324 | A1 | 6/2007 | Robert et al. |
| 2007/0209099 | A1 | 9/2007 | Issachar |
| 2008/0028902 | A1 | 2/2008 | Baggot et al. |
| 2008/0083746 | A1 | 4/2008 | Lucas et al. |
| 2008/0280088 | A1 | 11/2008 | Baum |
| 2009/0212153 | A1 | 8/2009 | Alalu |
| 2009/0235800 | A1 | 9/2009 | Germaine et al. |
| 2010/0112264 | A1 | 5/2010 | Barredo |
| 2010/0167896 | A1 | 7/2010 | Hada et al. |
| 2010/0199822 | A1 | 8/2010 | De Marco et al. |
| 2010/0242698 | A1 | 9/2010 | Hsu |
| 2010/0243780 | A1 | 9/2010 | Neto |
| 2010/0264159 | A1 | 10/2010 | Gordon |
| 2010/0309544 | A1 | 12/2010 | Nomura et al. |
| 2011/0192263 | A1 | 8/2011 | De Marco et al. |
| 2011/0290920 | A1 | 12/2011 | Kim et al. |
| 2011/0308363 | A1 | 12/2011 | Kien et al. |
| 2011/0308366 | A1 | 12/2011 | Redd |
| 2011/0308370 | A1 | 12/2011 | Hupp et al. |
| 2011/0308372 | A1 | 12/2011 | Mcneil et al. |
| 2011/0308405 | A1 | 12/2011 | Mcneil et al. |
| 2011/0308406 | A1 | 12/2011 | Mcneil et al. |
| 2011/0308754 | A1 | 12/2011 | Mcneil et al. |
| 2011/0311748 | A1 | 12/2011 | Hupp |
| 2011/0311749 | A1 | 12/2011 | Mcneil et al. |
| 2011/0311750 | A1 | 12/2011 | Mcneil et al. |
| 2011/0311751 | A1 | 12/2011 | Feldmann et al. |
| 2012/0111166 | A1 | 5/2012 | Yamada et al. |
| 2012/0174720 | A1 | 7/2012 | Powell et al. |
| 2012/0198979 | A1 | 8/2012 | Ohsawa |
| 2012/0216663 | A1 | 8/2012 | Carmichael |
| 2012/0234145 | A1 | 9/2012 | Kandemir |
| 2012/0234152 | A1 | 9/2012 | Carmichael |
| 2012/0245011 | A1 | 9/2012 | De Matteis |
| 2013/0036884 | A1 | 2/2013 | Schurch et al. |
| 2013/0049438 | A1 | 2/2013 | Nootbaar et al. |
| 2013/0286481 | A1 | 10/2013 | Mimura et al. |
| 2013/0294808 | A1 | 11/2013 | Douillard et al. |
| 2014/0174270 | A1 | 6/2014 | Demarco et al. |
| 2014/0216969 | A1 | 8/2014 | Cherian |
| 2014/0238210 | A1 | 8/2014 | Baggot et al. |
| 2014/0344702 | A1 | 11/2014 | Edge et al. |
| 2014/0346704 | A1 | 11/2014 | Sartini et al. |
| 2014/0366695 | A1 | 12/2014 | Kien et al. |
| 2014/0366702 | A1 * | 12/2014 | Kien ..................... B26D 3/085 83/886 |
| 2014/0370224 | A1 | 12/2014 | Kien et al. |
| 2015/0125810 | A1 | 5/2015 | Jodaikin et al. |
| 2015/0135925 | A1 | 5/2015 | Abrahams |
| 2015/0176218 | A1 | 6/2015 | Maladen et al. |
| 2015/0181971 | A1 | 7/2015 | York |
| 2015/0298340 | A1 | 10/2015 | Baggot et al. |
| 2016/0121501 | A1 | 5/2016 | Baggot et al. |
| 2016/0144525 | A1 | 5/2016 | Kenmotsu et al. |
| 2016/0271820 | A1 | 9/2016 | Slovut et al. |
| 2016/0271823 | A1 | 9/2016 | Slovut et al. |
| 2016/0271824 | A1 | 9/2016 | Slovut et al. |
| 2016/0345761 | A1 | 12/2016 | Olson et al. |
| 2016/0345786 | A1 | 12/2016 | Olson et al. |
| 2017/0280946 | A1 | 10/2017 | Weisang et al. |
| 2018/0132674 | A1 | 5/2018 | Olson et al. |
| 2018/0199766 | A1 | 7/2018 | Olson et al. |
| 2018/0201464 | A1 | 7/2018 | Slovut et al. |
| 2018/0264676 | A1 | 9/2018 | Kien et al. |
| 2018/0361606 | A1 | 12/2018 | Banowetz et al. |
| 2019/0077039 | A1 | 3/2019 | Glass et al. |
| 2019/0078264 | A1 | 3/2019 | Glass et al. |
| 2019/0078267 | A1 | 3/2019 | Glass et al. |
| 2019/0125139 | A1 | 5/2019 | Olson et al. |
| 2019/0152081 | A1 | 5/2019 | Slovut et al. |
| 2019/0232517 | A1 | 8/2019 | Slovut et al. |
| 2020/0078976 | A1 | 3/2020 | Schwamberger et al. |
| 2020/0085246 | A1 | 3/2020 | Olson et al. |
| 2020/0094998 | A1 | 3/2020 | Horz |
| 2020/0214511 | A1 | 7/2020 | Olson et al. |
| 2020/0290792 | A1 | 9/2020 | Yasui |
| 2021/0060809 | A1 | 3/2021 | Schwamberger et al. |
| 2021/0101772 | A1 | 4/2021 | Slovut et al. |
| 2021/0146566 | A1 | 5/2021 | Slovut et al. |
| 2021/0187776 | A1 | 6/2021 | Slovut et al. |
| 2021/0197415 | A1 | 7/2021 | Kien et al. |
| 2021/0317613 | A1 | 10/2021 | Glass et al. |
| 2023/0313468 | A1 | 10/2023 | Glass et al. |

FOREIGN PATENT DOCUMENTS

| | | | | |
|---|---|---|---|---|
| CA | 3072361 | A1 | 3/2019 | |
| CA | 3072516 | A1 | 3/2019 | |
| CA | 3072603 | A1 | 3/2019 | |
| CA | 3072779 | A1 | 3/2019 | |
| DE | 1090069 | B | 9/1960 | |
| DE | 1291188 | B | 3/1969 | |
| DE | 2706234 | A1 | 8/1978 | |
| DE | 10356037 | A1 | 7/2005 | |
| DE | 202005017013 | U1 | 1/2006 | |
| DE | 102005041180 | A1 | 3/2007 | |
| EP | 1010503 | A2 | 6/2000 | |
| FR | 2161144 | A5 | 7/1973 | |
| FR | 2377471 | A1 | 8/1978 | |
| GB | 808244 | A | 1/1959 | |
| GB | 923029 | A | 4/1963 | |
| GB | 2488782 | A | 9/2012 | |
| JP | H0884685 | A | 4/1996 | |
| JP | 2005153997 | A | 6/2005 | |
| JP | 2005296588 | A | 10/2005 | |
| JP | 2007117366 | A | 5/2007 | |
| WO | 9002639 | A1 | 3/1990 | |
| WO | WO-9723398 | A1 * | 7/1997 | ............ B26D 1/626 |

(56) References Cited

FOREIGN PATENT DOCUMENTS

| | | | |
|---|---|---|---|
| WO | 9825738 | A1 | 6/1998 |
| WO | 02100614 | A1 | 12/2002 |
| WO | 2019051459 | A1 | 3/2019 |
| WO | 2019051460 | A1 | 3/2019 |
| WO | 2019051461 | A1 | 3/2019 |
| WO | 2019051462 | A1 | 3/2019 |

OTHER PUBLICATIONS

All Office Actions; U.S. Appl. No. 16/124,587, filed Sep. 7, 2018.
All Office Actions; U.S. Appl. No. 16/124,621, filed Sep. 7, 2018.
All Office Actions; U.S. Appl. No. 16/127,450, filed Sep. 11, 2018.
All Office Actions; U.S. Appl. No. 16/127,519, filed Sep. 11, 2018.
All Office Actions; U.S. Appl. No. 16/127,417, filed Sep. 11, 2018.
All Office Actions; U.S. Appl. No. 16/127,540, filed Sep. 11, 2018.
All Office Actions; U.S. Appl. No. 16/127,561, filed Sep. 11, 2018.
All Office Actions; U.S. Appl. No. 17/186,031, filed Feb. 26, 2021.
All Office Actions; U.S. Appl. No. 18/307,031, filed Apr. 26, 2023.
All Office Actions; U.S. Appl. No. 18/476,351, filed Sep. 28, 2023.
Silhouette School—How To Easily Make Wavy Text in Silhouette Studio; dated May 15, 2014, 6 Pages.
Unpublished U.S. Appl. No. 18/476,351, filed Sep. 28, 2023 to Katie Kristine Glass et al.

* cited by examiner

PERFORATING APPARATUS AND METHOD FOR MANUFACTURING A SHAPED LINE OF WEAKNESS

CROSS REFERENCE TO RELATED APPLICATION

This application is a continuation of, and claims priority under 35 U.S.C. § 120 to, U.S. patent application Ser. No. 16/124,621, filed on Sep. 7, 2018, which claims the benefit, under 35 USC § 119(e), of U.S. Provisional Application No. 62/556,633, filed Sep. 11, 2017, the substance of which is incorporated herein by reference.

FIELD

The present disclosure relates to nonlinear lines of weakness for rolled products, and more specifically, relates to an apparatus and method for manufacturing a nonlinear line of weakness for rolled products.

BACKGROUND

Many articles and packages include or may include a strip of material that has a line of weakness having one or more perforations to aid in tearing the article or package. For example, articles may include wax paper, aluminum foil, disposable bags, and sanitary tissue products, such as toilet tissue, facial tissue, and paper towels manufactured in the form of a web. Sanitary tissue products include lines of weakness to permit tearing off discrete sheets, for example, as is well known in the art. Such products are commonly used in households, businesses, restaurants, shops, and the like.

Typically, a line of weakness consists of a straight perforation across the width of the web. Creating perforations at high speeds and long widths is very challenging. Small vibrations in the equipment may result in non-perforated areas and/or inconsistent quality in the perforation and/or additional wear on the equipment. Further, tight tolerances between equipment must be maintained. Generally, there are three ways to perforate webs: die cutting, laser cutting, and flex blade cutting. Die cutting is a compression or crush cut in which a knife contacts a hardened anvil roll or a male roll interacts with a female roll to create one or more perforations. Die cutting usually is associated with high replacement costs and low speeds. Further die cutting does not allow for accuracy at long widths or mismatched speed operation. Similarly, laser cutting is a high-powered method to perforate webs. Laser cutting is usually used on thicker substrates and on cuts requiring a high degree of accuracy. Still further, flex blade cutting is a cut created by shearing the web. Flex blade cutting requires at least one blade to flex against a relatively stationary blade or anvil during operation to cut the web. Relative to the above cutting methods, flex blade cutting is generally lower cost, may be performed at increased speeds, and may be run at mismatched speeds. In addition to the above, water jet, steam, and spark aperture cutting methods may also be used to create lines of weakness. These methods have been found to be incompatible with the product being manufactured and/or inadequate for high speed, low cost production of perforated webs.

It has been found that consumers desire products that are usable and have a distinguishing feature over other products. Manufacturers of various products, for example sanitary tissue products, desire that consumers of such products be able to readily distinguish their products from similar products produced by competitors. One way a manufacturer may distinguish its products from other products is to impart physical characteristics into the web that differ from other manufacturers' products. A shaped perforation is one distinguishing characteristic that may be added to the product. The shape of the line of weakness would not only provide a way for consumers to distinguish a manufacture's product, but also communicate to consumers a perception of luxury, elegance, and softness and/or strength.

Further, manufactures desire a shaped perforation that consumers of such products may easily and readily interact with. Often a straight perforation on a sanitary tissue product, for example, may rest directly on the adjacent layer making it difficult to see the end of the sheet. This may make it difficult for a user to locate, grasp, and/or dispense the product. A straight perforation may allow for only a single plane of the product on which a user may grasp for dispensing.

However, producing a web with a shaped perforation adds more complexity to the manufacturing process. As previously stated, tight tolerances and minimal to no vibration are required in manufacturing a line of weakness at the high speeds necessary for commercial viability. Thus, adding a shape to the anvil and/or the blade may increase the risk of introducing processing complexities and complications into commercial manufacturing operations for a perforated web.

Current manufacturing processes require relatively high manufacturing speeds. Past processes have been unable to manufacture a product with a shaped line of weakness at these relatively high manufacturing speeds.

Therefore, it would be beneficial to provide a process and an apparatus that produces a rolled product having a shaped line of weakness at high manufacturing speeds.

SUMMARY

The present disclosure relates to nonlinear lines of weakness for rolled products, and more specifically, relates to an apparatus and method for manufacturing a nonlinear line of weakness for rolled products. In some embodiments, the method of perforating a web may include: rotating a cylinder about a longitudinal cylinder axis, the cylinder comprising an outer circumferential surface, wherein the outer circumferential surface defines a plurality of recessed portions, wherein a plurality of anvil blocks are positioned within the plurality of recessed portions, wherein a portion of the plurality of anvil blocks are disposed radially about the outer circumferential surface and define cavities therebetween, and wherein each of the plurality of anvil blocks comprise an anvil bead; operatively engaging a blade with the anvil beads, wherein the blade is substantially parallel to the longitudinal cylinder axis, and wherein the blade comprises a plurality of teeth; feeding a web between the anvil bead and the blade while the blade cooperates in contacting relationship with the anvil bead; perforating the web to form a shaped line of weakness; generating debris from perforating the web; controlling the debris such that the debris is drawn to the cavity; and expelling the debris from the cavity of the rotating cylinder.

In some embodiments, the method of perforating a web may include: rotating a cylinder about a longitudinal cylinder axis, the cylinder comprising an outer circumferential surface, wherein the outer circumferential surface defines a plurality of recessed portions, wherein a plurality of anvil blocks are positioned within the plurality of recessed portions, wherein the plurality of anvil blocks are radially disposed about the outer circumferential surface and define cavities therebetween, and wherein each of the plurality of anvil blocks comprise an anvil bead; operatively engaging a blade with the anvil beads, wherein the blade is substantially parallel to the longitudinal cylinder axis, and wherein at least one of the blade and the anvil comprise a plurality of teeth; feeding a web between the cylinder and the blade while the blade cooperates in contacting relationship with the anvil bead; perforating the web to form a shaped line of weakness; generating debris from perforating the web; controlling the debris such that the debris is drawn into the cavities between the radially spaced anvil blocks and away from the web; expelling the debris from the cavities of the rotating cylinder. The cylinder may include a cylinder diameter. The anvil block may include an anvil block surface and the anvil block surface may have an anvil block diameter. The anvil bead may include an anvil bead tip and the anvil bead tip may have an anvil bead diameter. The difference of the cylinder diameter and the anvil block diameter may be from about 0.6 inches to about 0.8 inches, the difference of the cylinder diameter and the anvil bead diameter may be from about 0.6 inches to about 1.2 inches, and the difference of the anvil bead diameter and the anvil block diameter may be from about 0.2 inches to about 0.4 inches.

In some embodiments, the method of perforating a web may include: rotating a cylinder about a longitudinal cylinder axis, the cylinder comprising an outer circumferential surface, wherein the outer circumferential surface defines a plurality of recessed portions, wherein a plurality of anvil blocks are positioned within the plurality of recessed portions, and wherein each of the plurality of anvil block comprise an anvil bead, wherein a cavity is form between adjacent anvil blocks positioned radially about the outer circumferential surface of the cylinder; rotating the anvil bead at a first speed; operatively engaging a blade with the anvil beads, wherein the blade is substantially parallel to the longitudinal cylinder axis, and wherein the blade comprises a plurality of teeth; advancing a web toward the blade at a second speed, wherein the second speed is less than the first speed; feeding a web between the cylinder and the blade while the blade cooperates in contacting relationship with the anvil bead; perforating the web to form a shaped line of weakness; generating debris from perforating the web; controlling the debris such that the debris is drawn into the cavity of the rotating cylinder and away from the web in a pre-perforation zone; and expelling the debris from the cavity of the rotating cylinder in a post-perforation zone.

BRIEF DESCRIPTION OF THE DRAWINGS

The above-mentioned and other features and advantages of this disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION

Figure 1:
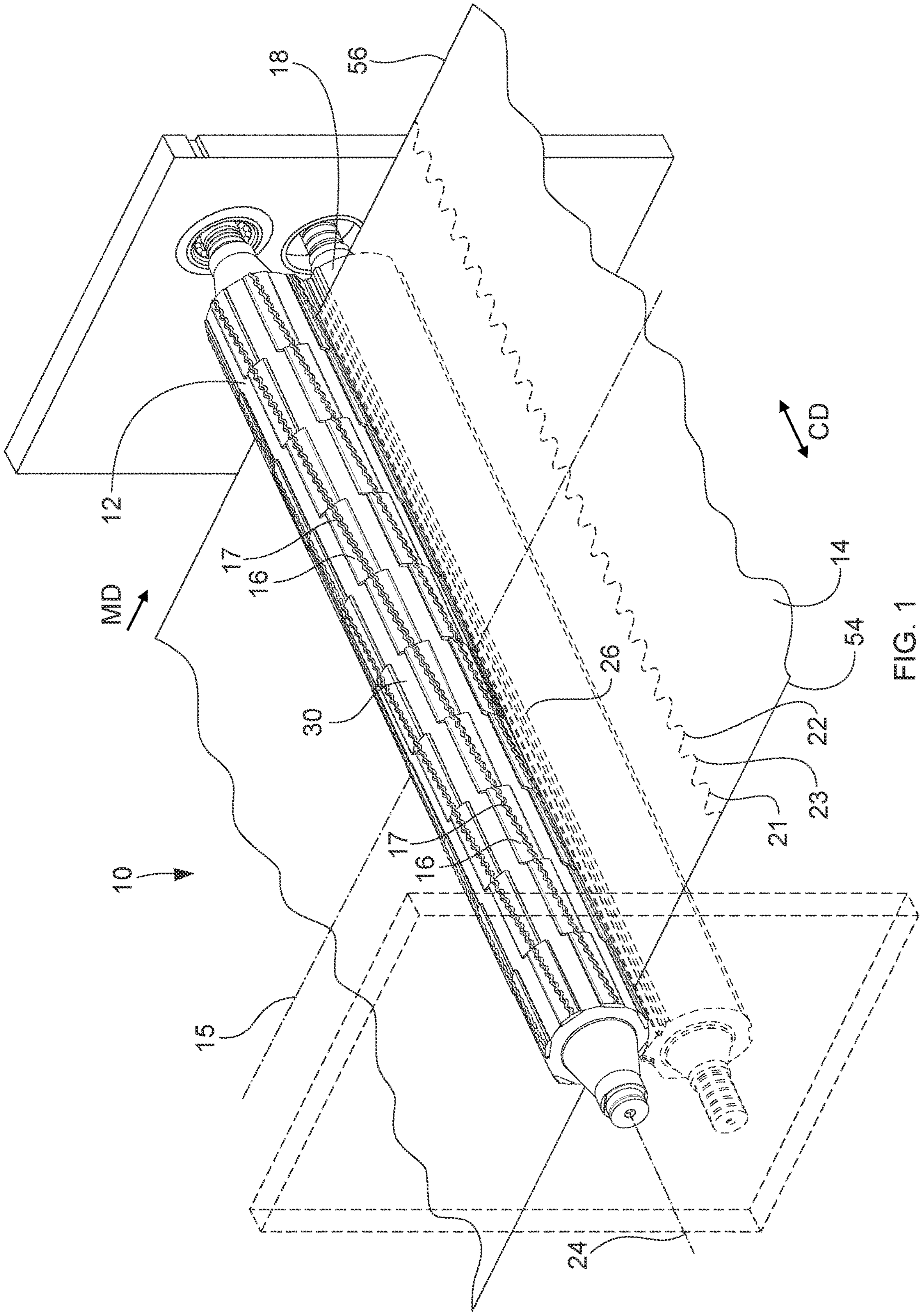
FIG. 1 is a perspective view of a perforating apparatus in accordance with one non-limiting embodiment of the present disclosure.

Various non-limiting embodiments of the present disclosure will now be described to provide an overall understanding of the principles of the structure, function, manufacture, and use of a web comprising a shaped line of weakness, also referred to herein as a non-linear line of weakness. The features illustrated or described in connection with one non-limiting embodiment may be combined with the features of other non-limiting embodiments. Such modifications and variations are intended to be included within the scope of this disclosure.

"Fibrous structure" as used herein means a structure that comprises one or more fibrous elements. In one example, a fibrous structure according to the present disclosure means an association of fibrous elements that together form a structure capable of performing a function. A nonlimiting example of a fibrous structure of the present disclosure is an absorbent paper product, which may be a sanitary tissue product such as a paper towel, bath tissue, or other rolled, absorbent paper product.

Non-limiting examples of processes for making fibrous structures include known wet-laid papermaking processes, air-laid papermaking processes, and wet, solution, and dry filament spinning processes, for example meltblowing and spunbonding spinning processes, that are typically referred to as nonwoven processes. Such processes may comprise the steps of preparing a fiber composition in the form of a suspension in a medium, either wet, more specifically aqueous medium, or dry, more specifically gaseous, i.e. with air as medium. The aqueous medium used for wet-laid processes is oftentimes referred to as fiber slurry. The fibrous suspension is then used to deposit a plurality of fibers onto a forming wire or belt such that an embryonic fibrous structure is formed, after which drying and/or bonding the fibers together results in a fibrous structure. Further processing the fibrous structure may be carried out such that a finished fibrous structure is formed. For example, in typical papermaking processes, the finished fibrous structure is the fibrous structure that is wound on the reel at the end of papermaking and may subsequently be converted into a finished product (e.g., a sanitary tissue product).

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present disclosure may be spun from polymer melt compositions via suitable spinning operations, such as meltblowing and/or spunbonding and/or they may be obtained from natural sources such as vegetative sources, for example trees.

The fibrous elements of the present disclosure may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that may be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol, thermoplastic polymer, such as polyesters, nylons, polyolefins such as polypropylene filaments, polyethylene filaments, and biodegradable thermoplastic fibers such as polylactic acid filaments, polyhydroxyalkanoate filaments, polyesteramide filaments and polycaprolactone filaments.

"Fiber" as used herein means an elongate particulate as described above that exhibits a length of less than 5.08 cm (2 in.) and/or less than 3.81 cm (1.5 in.) and/or less than 2.54 cm (1 in.). A fiber may be elongate physical structure having an apparent length greatly exceeding its apparent diameter (i.e., a length to diameter ratio of at least about 10.) Fibers having a non-circular cross-section and/or tubular shape are common; the "diameter" in this case may be considered to be the diameter of a circle having a cross-sectional area equal to the cross-sectional area of the fiber.

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, glass fibers and polyvinyl alcohol fibers.

Staple fibers may be produced by spinning a filament tow and then cutting the tow into segments of less than 5.08 cm (2 in.) thus producing fibers.

In one example of the present disclosure, a fiber may be a naturally occurring fiber, which means it is obtained from a naturally occurring source, such as a vegetative source, for example a tree and/or other plant. Such fibers are typically used in papermaking and are oftentimes referred to as papermaking fibers. Papermaking fibers useful in the present disclosure include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers may be blended, or alternatively, may be deposited in layers to provide a stratified web. Also applicable to the present disclosure are fibers derived from recycled paper, which may contain any or all of the above categories of fibers as well as other non-fibrous polymers such as fillers, softening agents, wet and dry strength agents, and adhesives used to facilitate the original papermaking.

In addition to the various wood pulp fibers, other cellulosic fibers such as cotton linters, rayon, lyocell, and bagasse fibers may be used in the fibrous structures of the present disclosure.

"Sanitary tissue product" as used herein means one or more finished fibrous structures, that is useful as a wiping implement for post-urinary and post-bowel movement cleaning (e.g., toilet tissue, also referred to as bath tissue, and wet wipes), for otorhinolaryngological discharges (e.g., facial tissue), and multi-functional absorbent and cleaning and drying uses (e.g., paper towels, shop towels). The sanitary tissue products may be embossed or not embossed and creped or uncreped.

In one example, sanitary tissue products rolled about a fibrous core of the present disclosure may have a basis weight between about 10 g/m2 to about 160 g/m2 or from about 20 g/m2 to about 150 g/m2 or from about 35 g/m2 to about 120 g/m2 or from about 55 to 100 g/m2, specifically reciting all 0.1 g/m2 increments within the recited ranges. In addition, the sanitary tissue products may have a basis weight between about 40 g/m2 to about 140 g/m2 and/or from about 50 g/m2 to about 120 g/m2 and/or from about 55 g/m2 to about 105 g/m2 and/or from about 60 to 100 g/m2, specifically reciting all 0.1 g/m2 increments within the recited ranges. Other basis weights for other materials, such as wrapping paper and aluminum foil, are also within the scope of the present disclosure.

"Basis Weight" as used herein is the weight per unit area of a sample reported in lbs/3000 ft2 or g/m2. Basis weight may be measured by preparing one or more samples to create a total area (i.e., flat, in the material's non-cylindrical form) of at least 100 in2 (accurate to +/−0.1 in2) and weighing the sample(s) on a top loading calibrated balance with a resolution of 0.001 g or smaller. The balance is protected from air drafts and other disturbances using a draft shield. Weights are recorded when the readings on the balance become constant. The total weight (lbs or g) is calculated and the total area of the samples (ft2 or m2) is measured. The basis weight in units of lbs/3,000 ft2 is calculated by dividing the total weight (lbs) by the total area of the samples (ft2) and multiplying by 3000. The basis weight in units of g/m2 is calculated by dividing the total weight (g) by the total area of the samples (m2).

"Density" as used herein is calculated as the quotient of the Basis Weight expressed in grams per square meter divided by the Caliper expressed in microns. The resulting Density is expressed as grams per cubic centimeter (g/cm3 or g/cc). Sanitary tissue products of the present disclosure may have a density of greater than about 0.05 g/cm3 and/or greater than 0.06 g/cm3 and/or greater than 0.07 g/cm3 and/or less than 0.10 g/cm3 and/or less than 0.09 g/cm3 and/or less than 0.08 g/cm3 and/or less than 0.60 g/cm3 and/or less than 0.30 g/cm3 and/or less than 0.20 g/cm3 and/or less than 0.15 g/cm3 and/or less than 0.10 g/cm3 and/or less than 0.07 g/cm3 and/or less than 0.05 g/cm3 and/or from about 0.01 g/cm3 to about 0.20 g/cm3 and/or from about 0.02 g/cm3 to about 0.15 g/cm3 and/or from about 0.02 g/cm3 to about 0.10 g/cm3.

"Ply" as used herein means an individual, integral fibrous structure.

"Plies" as used herein means two or more individual, integral fibrous structures disposed in a substantially contiguous, face-to-face relationship with one another, forming a multi-ply fibrous structure and/or multi-ply sanitary tissue product. It is also contemplated that an individual, integral fibrous structure may effectively form a multi-ply fibrous structure, for example, by being folded on itself.

"Rolled product(s)" as used herein include plastics, fibrous structures, paper, sanitary tissue products, paperboard, polymeric materials, aluminum foils, and/or films that are in the form of a web and may be wound about a core. For example, the sanitary tissue product may be convolutedly wound upon itself about a core or without a core to form a sanitary tissue product roll or may be in the form of discrete sheets, as is commonly known for toilet tissue and paper towels.

"Machine Direction," MD, as used herein is the direction of manufacture for a perforated web. The machine direction may be the direction in which a web is fed through a perforating apparatus that may comprise a rotating cylinder and support, as discussed below in one embodiment. The machine direction may be the direction in which web travels as it passes through a blade and an anvil of a perforating apparatus.

"Cross Machine Direction," CD as used herein is the direction substantially perpendicular to the machine direction. The cross machine direction may be substantially perpendicular to the direction in which a web is fed through a cylinder and lower support in one embodiment. The cross machine direction may be the direction substantially perpendicular to the direction in which web travels as it passes through a blade and an anvil.

The present disclosure relates to nonlinear lines of weakness for rolled products, and more specifically, relates to an apparatus and method for manufacturing a nonlinear line, also referred to herein as shaped, of weakness for rolled products.

The process and apparatus for perforating the web includes rotating a cylinder about a longitudinal cylinder axis. The cylinder may include an outer circumferential surface that substantially surrounds the longitudinal cylinder axis. The outer circumferential surface may include a plurality of recessed portions. These recessed portions may be positioned both longitudinally, also referred to herein as axially, and radially about the outer circumferential surface. The recessed portions are configured to accept an anvil block or two or more anvil block segments. The anvil blocks may be removably connected with the recessed portions. The anvil blocks may be offset from one another in the longitudinal/axial direction. Further, the anvil blocks may be positioned radially about the outer circumferential surface and cavities are formed between adjacent, radially positioned anvil blocks. These cavities are formed by the anvil blocks extending radially above the outer circumferential surface of the cylinder. Each of the anvil blocks may include an anvil bead. The anvil bead may be removably connected to the anvil block or the anvil bead and the anvil block may be manufactured together. The anvil beads together form a shape extending along the longitudinal cylinder axis. The anvil beads operatively engage the blade. The blade may be supported by a support and a clamp. The blade may include a single blade or a plurality of blades. The blade may be stationary or the blade may oscillate in a direction substantially parallel to the cross direction to minimize wear. The web is fed between the anvil bead and the blade to form perforations. The perforations imparted to the web form a shaped, or non-linear, line of weakness. However, debris is generated from perforating the web and/or upstream processing of the web. This debris is controlled due to the shape of the cylinder in combination with the anvil block and the anvil bead. As previously discussed, the cavity is formed between adjacent anvil blocks, including anvil beads. Due to the air flow created by the rotating cylinder and the geometry of the anvil block, anvil bead, and the cavity, the debris is drawn into the cavity and away from the web. This substantially minimizes any adverse effect the debris may have on the web and/or the perforating process. The debris is held in the cavity until the cavity is rotated to a position downstream of the nip, where the anvil bead engages the blade. Once the cavity is downstream of the nip, the debris may be expelled from the cavity and any other debris may be pushed away from the outer circumferential surface of the cylinder. Due the aforementioned process, the strain on the web may be maintained throughout the perforating process.

Referring to FIG. 1, a perforating apparatus 10 is shown for forming a shaped line of weakness 21 comprising one or more perforations 22 and one or more unperforated regions 23 therebetween on a web 14. The perforating apparatus 10 comprises a cylinder 12 and a support 18. The cylinder 12 may be suspended between one or more braces that serve to hold cylinder in operative position and allow the cylinder to rotate. The cylinder 12 has a longitudinal cylinder axis 24 about which the cylinder 12 is rotatable. The cylinder 12 may have a substantially circular shaped cross-section or any other shaped cross-section that may rotate about an axis and produce a web 14 with a line of weakness 21. The cylinder 12 may be a solid or substantially hollow cylindrical shaped device. The cylinder 12 may comprise an outer circumferential surface 30 positioned radially outward from and substantially surrounding the longitudinal cylinder axis 24.

As illustrated in FIG. 1, a plurality of anvil blocks 16 may be disposed on the outer circumferential surface 30 of the cylinder 12. The anvil blocks 16 may be offset from one another along the longitudinal cylinder axis 24. Further, there may be anvil blocks 16 disposed radially about the outer circumferential surface 30 of the cylinder 12. Adjacent anvil block positioned radially about the outer circumferential surface 30 define cavities 42 therebetween. Each of the anvil blocks 16 may include an anvil bead 17. The anvil bead 17 protrudes radially away from a surface 38 of the anvil block 16. The anvil bead 17 may be shaped, also referred to herein as non-linear. Further, the anvil beads 17 may be helically mounted along the longitudinal cylinder axis 24.

Opposite the cylinder 12, the support 18 may comprise a blade 26. The blade 26 may be disposed on the support 18. By disposed is meant the blade may be attached, removeably attached, clamped, bolted, or otherwise held by the support 18 in a stable operative position with respect to the cylinder 12. The blade 26 may be a single blade or include a plurality of blade segments.

The cylinder 12 may be rotated about the longitudinal cylinder axis 24 such that the anvil beads 17 engage the blade 26. The web 14 may include a longitudinal web axis 15, a first side edge 54, and a second side edge 56 opposite the first side edge 54. The web 14 may be fed through the perforating apparatus such that the line of weakness imparted to the web extends from the first side edge 54 to the second side edge 56. The web 14 is fed between the anvil beads 17 and the blade 26 such that the longitudinal web axis 15 extends in a direction substantially parallel to the machine direction MD. The longitudinal web axis 15 is also tangential to the outer circumferential surface 30 of the cylinder 12 as the web 14 passes between the anvil bead 17 and the blade 26. The anvil bead 17 and the blade 26 cooperate in contacting relationship as the web 14 traverses through resulting a shaped line of weakness 21. The shaped line of weakness includes perforations 22 and unperforated regions 23. Generally, the shape of the line of weakness is the same as or similar to the shape of the anvil bead 17.

The perforating apparatus 10 is able to produce a rolled product having unique and unexpected qualities and characteristics such as described in the application filed with (U.S. Ser. No. 62/556,720) on Sep. 11, 2017 and titled SANITARY TISSUE PRODUCT WITH A SHAPED LINE OF WEAKNESS.

Figure 2A:
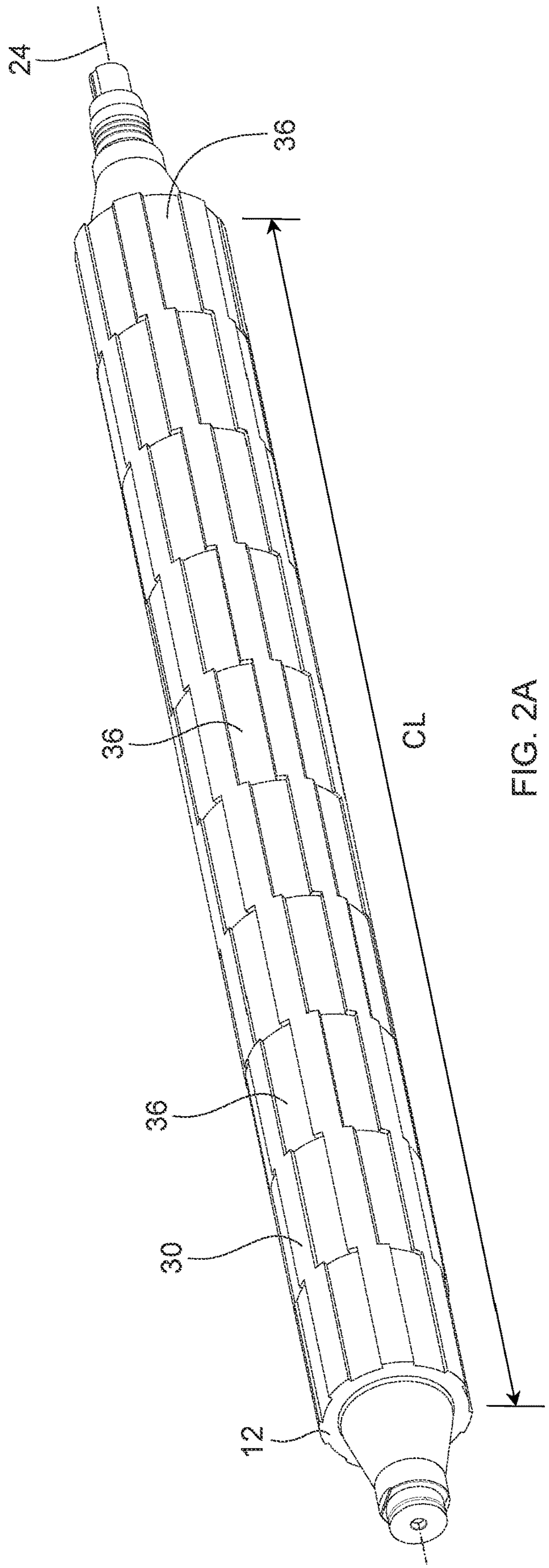
FIG. 2A is a perspective view of a cylinder in accordance with one non-limiting embodiment of the present disclosure.
Figure 2B:
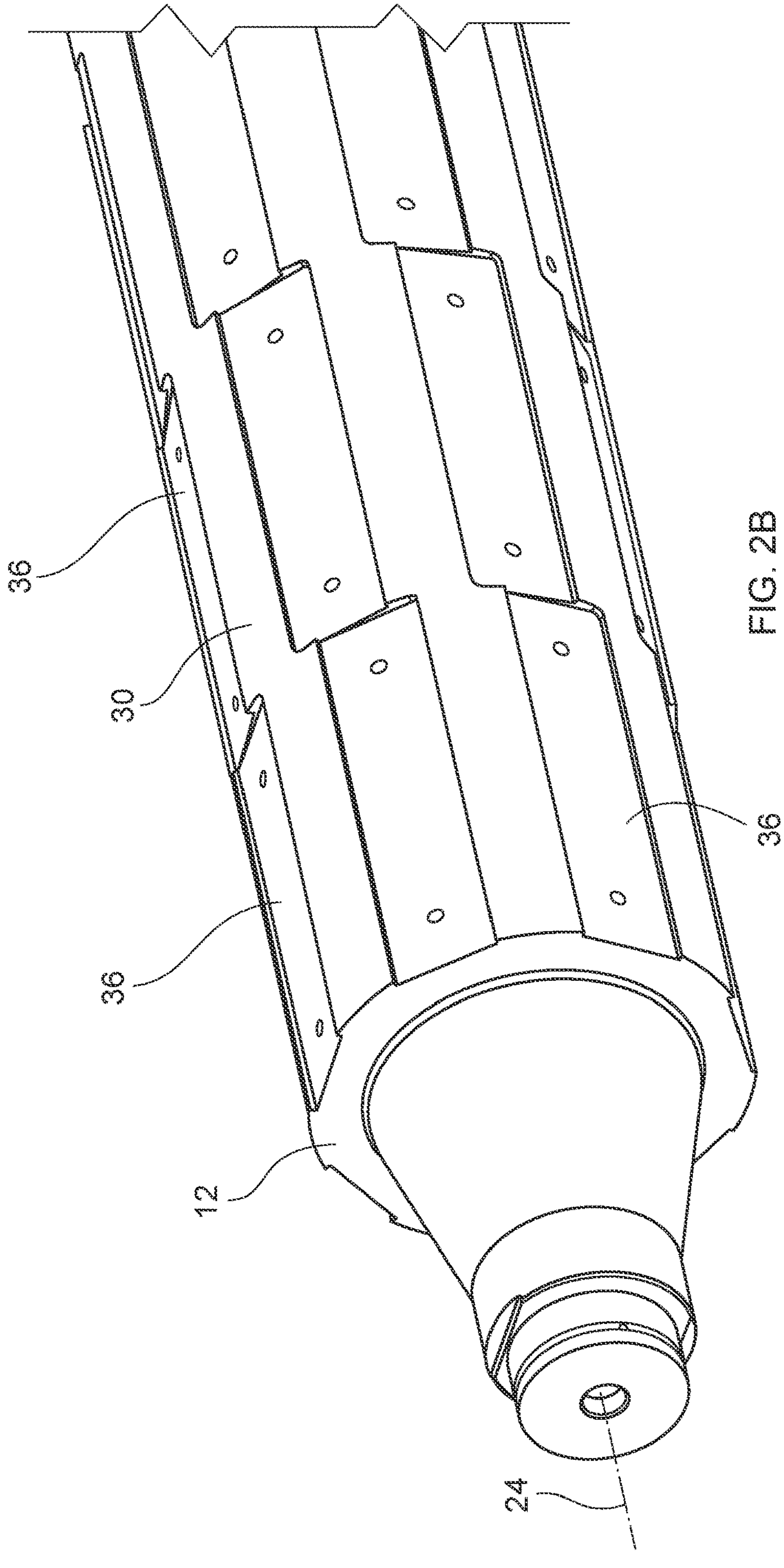
FIG. 2B is a partial perspective view of a cylinder in accordance with one non-limiting embodiment of the present disclosure.

As previously stated, the perforating apparatus 10 may include a cylinder 12. The cylinder 12 may be configured to rotate about a longitudinal cylinder axis 24. The cylinder 12 may define a plurality of recessed portions 36, as illustrated in FIGS. 2A and 2B. The recessed portions 36 may be spaced along the longitudinal cylinder axis 24 and circumferentially about the outer circumferential surface 30. The recessed portions 36 may be configured to accept one or more anvil blocks 16. The recessed portions 36 may be any size and shape such that the anvil blocks 16 may be disposed within the recessed portion. The cylinder 12 may have a cylinder length CL extending in the cross direction CD. The cylinder length CL may be the same length as or longer than the web 14 that is to undergo processing. The cylinder length CL may be from about 50 inches to about 200 inches and/or from about 75 inches to about 150 inches and/or from about 90 inches to 110 inches, including all 0.1 inch increments between the recited ranges. The cylinder 12 may be made from metal, such as steel, aluminum, tungsten carbide, or another material that may be rotated at the desired manufacturing speeds.

It is to be appreciated that in some embodiments, the cylinder 12 may not include recessed portions and the anvil blocks may be attached to the outer circumferential surface 30 of the cylinder 12. It is also to be appreciated that a protruding portion may be machined or attached to the outer circumferential surface 30 of the cylinder onto which the anvil block 16 and/or the anvil bead 17 may be removably connected.

Figure 3A:
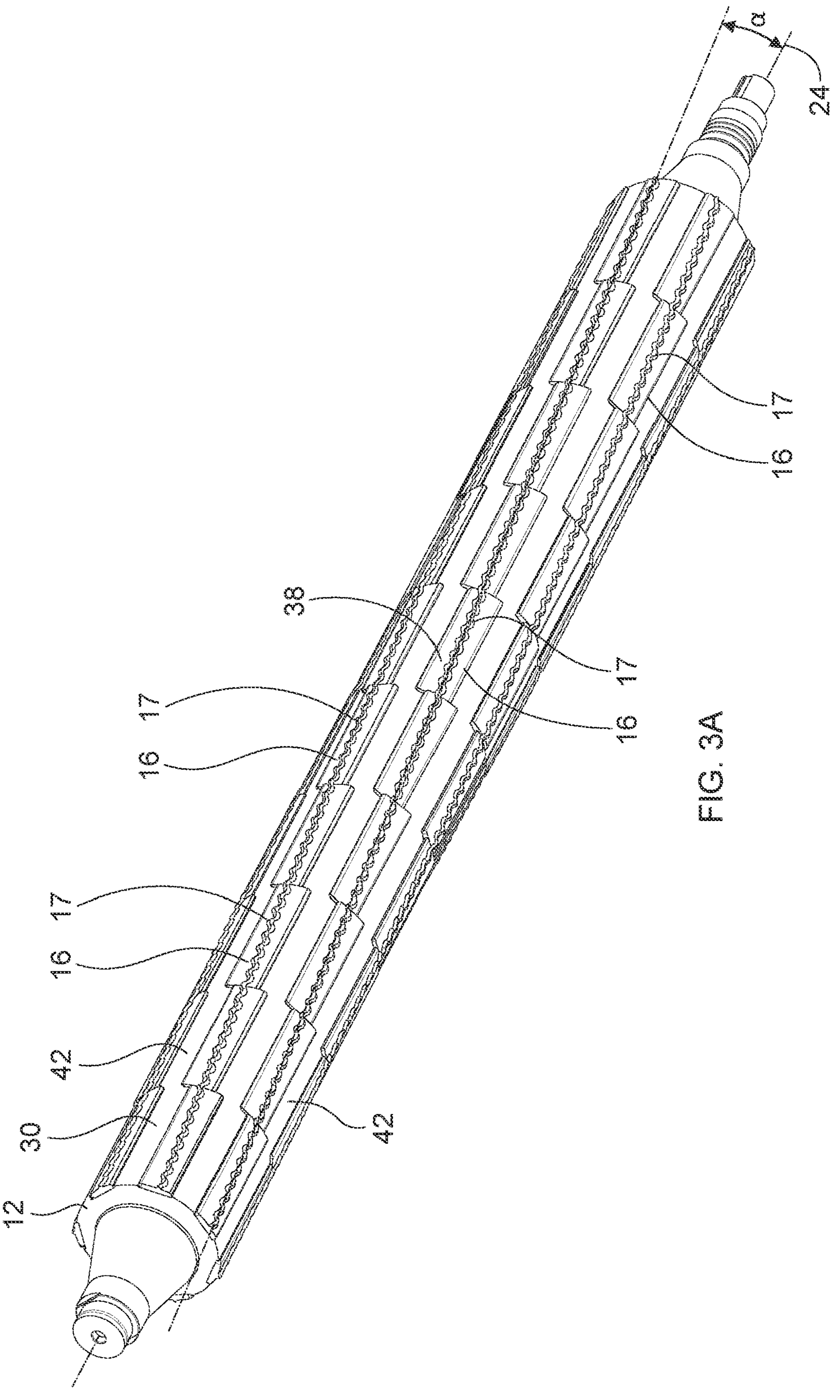
FIG. 3A is a perspective view of a cylinder including an anvil block and an anvil bead in accordance with one non-limiting embodiment of the present disclosure.
Figure 3B:
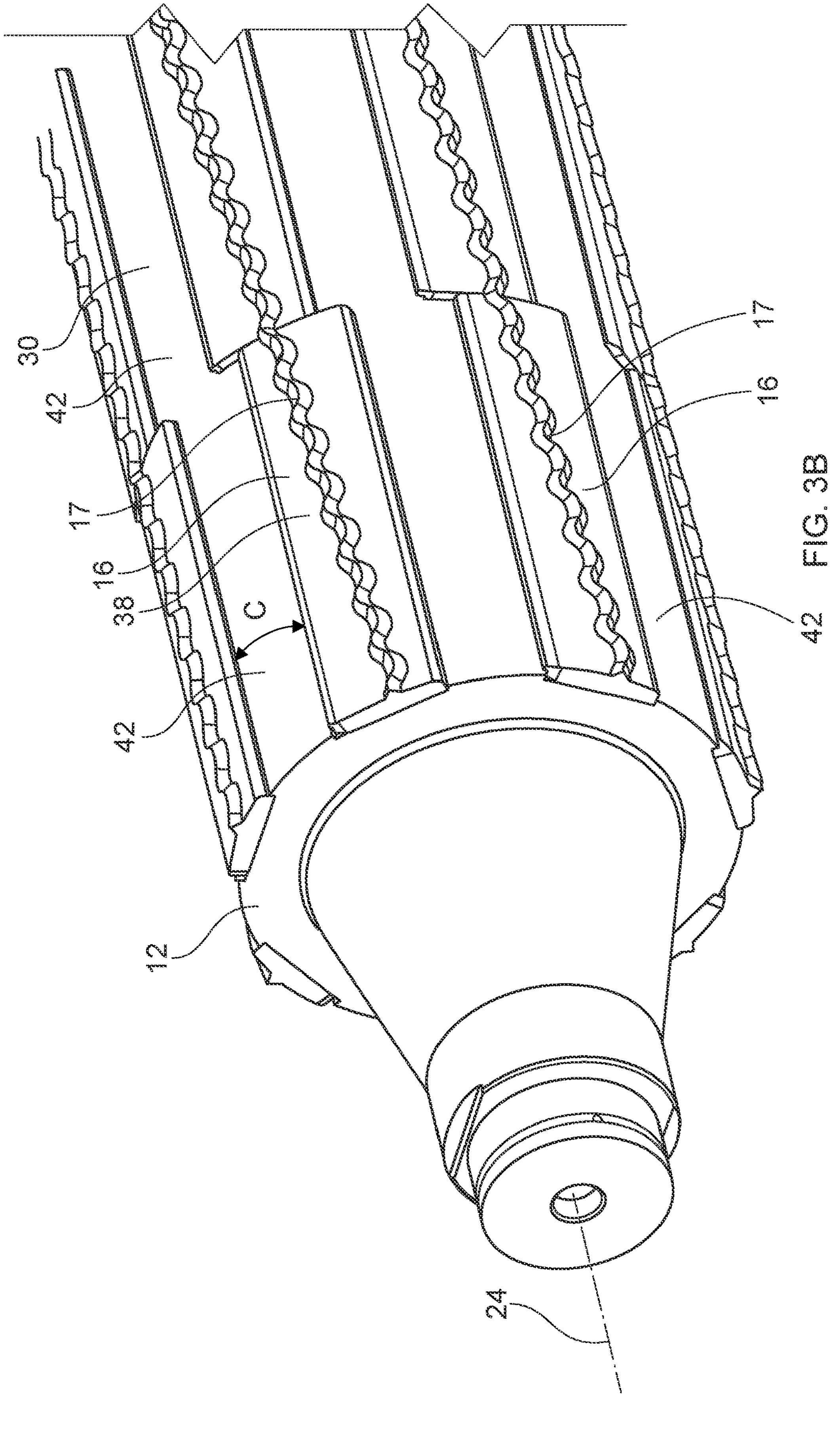
FIG. 3B is a partial perspective view of a cylinder including an anvil block and an anvil bead in accordance with one non-limiting embodiment of the present disclosure.
Figure 3C:
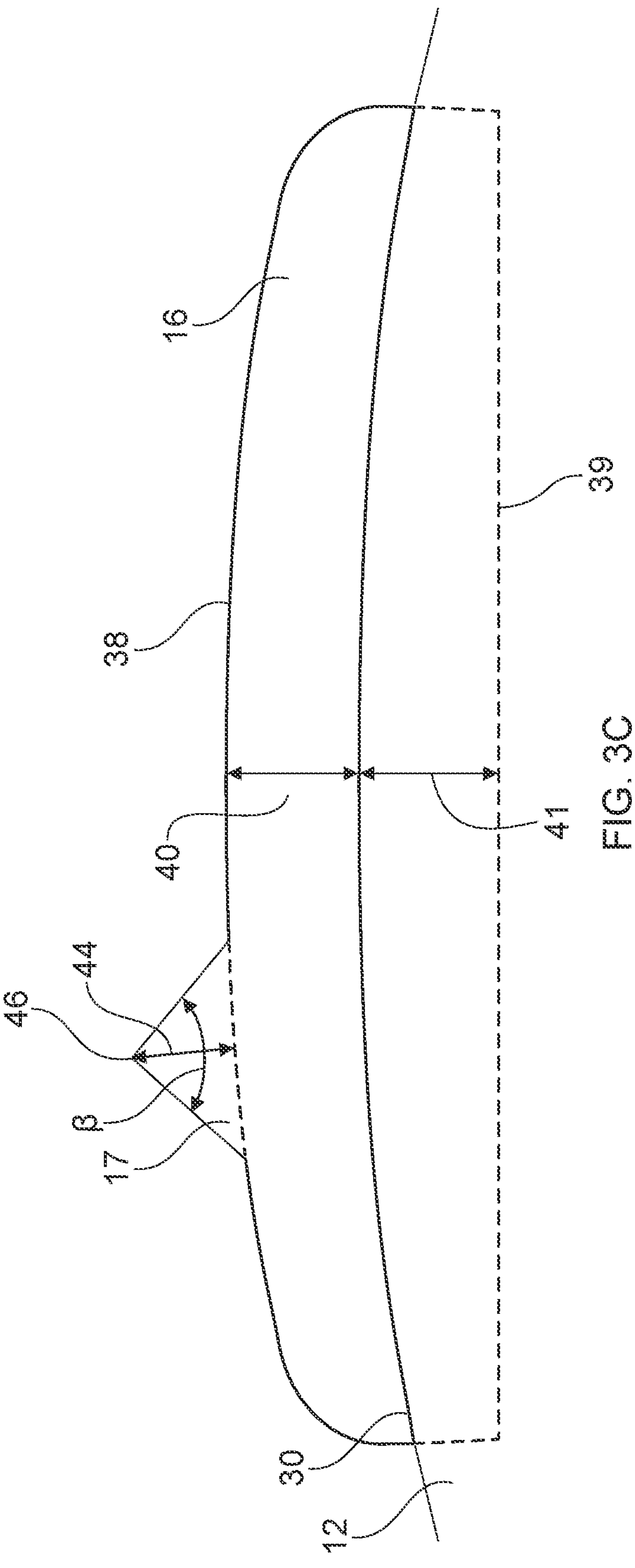
FIG. 3C is a partial side view of an anvil block and an anvil bead in accordance with one non-limiting embodiment of the present disclosure.

As illustrated in FIGS. 3A-3C, the anvil blocks 16 may be removably connected to the cylinder 12. In some embodiments, the anvil blocks 16 may be magnetically attached to the recessed portions 36 of the cylinder 12. In some embodiments, the anvil blocks 16 may be chemically attached, such as by adhesive, or mechanically attached, such as by screwing, pinning, clamping, bolting, or otherwise joining the anvil block to the outer circumferential surface 30 of the cylinder 12. The individual anvil blocks allow for ease of replacement and individual adjustment. For example, worn and/or damaged anvil blocks may be individually replaced. Further, the removable anvil blocks allow for different anvil bead profiles to switch easily and for each anvil block to be individually adjusted for optimum processing.

The anvil blocks 16 may include a first anvil block surface 38 and a second anvil block surface 39, which is opposite the first anvil block surface 38. The second anvil block surface 39 may be in contacting relationship with the recessed portion and/or the outer circumferential surface 30 of the cylinder 12. The anvil block 16 may include a recessed anvil block height 41, which is the portion of the anvil block positioned below the outer circumferential surface 30. The recessed anvil block height 41 is measured from the outer circumferential surface 30 to the second anvil block surface 39. The recessed anvil block height may be from about 0.05 inches to about 0.4 inches and/or from about 0.1 inches to about 0.3 inches, including all 0.01 inch increments between the recited ranges. The first anvil block surface 38 may protrude radially away from the outer circumferential surface 30 of the cylinder 12 forming an anvil block height 40. The anvil block height 40 includes the portion of the anvil block that extends above the outer circumferential surface 30 of the cylinder. The anvil block height is measured from the outer circumferential surface 30 to the first anvil block surface 38. In some embodiments, the anvil block height 40 may be from about 0.1 inches to about 0.5 inches and/or from about 0.2 inches to about 0.4 inches, including all 0.01 inch increments between the recited ranges. For example, an anvil block height 40 of 0.3 inches would be included in the aforementioned recited ranges. Each anvil block 16 may have an anvil block height 40 such that a cavity 42 is formed between adjacent, radially positioned anvil blocks 16, as indicated by arrow C in FIG. 3B. More specifically, anvil blocks 16 disposed longitudinally along the longitudinal cylinder axis and positioned about the outer circumferential surface 30, form cavities 42 extending between the anvil blocks that are adjacent to one another radially about the outer circumferential surface and along the longitudinal cylinder axis. The cavity 42 allows debris from the manufacturing process to be controlled during the manufacturing process, which will be described in more detail herein. It is also to be appreciated that that the anvil block surface 38 and the anvil block surface 39 may each have a radius of curvature, may be substantially planar, or any other shape that allows for perforation of the web as described herein.

The number of anvil blocks including anvil beads positioned radially about the outer circumferential surface may be based on the distance that is desired between adjacent lines of weakness on the web and/or the size of the cylinder. Successive lines of weakness 21 imparted to the web 14 may be spaced at a distance equal to about the distance between adjacent, radially positioned anvil beads. In some embodiments, the anvil blocks may be spaced such that the anvil blocks are equally spaced from one another about the outer circumferential surface of the cylinder. For example, for a cylinder 12 including three anvil blocks positioned radially about the circumference of the cylinder, the three anvil blocks will be spaced at about one-third increments about the outer circumferential surface 30 of the cylinder 12.

It is also to be appreciated that a single anvil block may include one or more anvil block segments. For example, several anvil block segments may fit within a recessed portion 36 to form an anvil block. The anvil block may be broken into one or more segments for machinability and/or ease of replacement, for example.

Figure 8J:
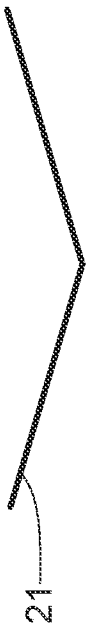
FIGS. 8A-8Q are schematic representations of the shape of a line of weakness in accordance with one non-limiting embodiment of the present disclosure.
Figure 8K:
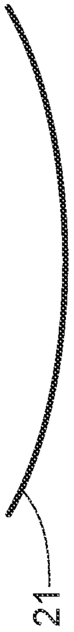
Figure 8L:
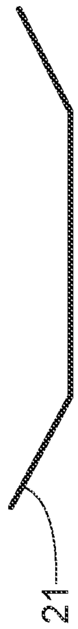
Figure 8M:
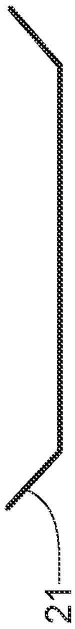
Figure 8N:
Figure 8O:
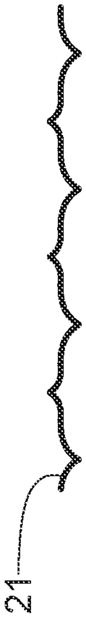
Figure 8P:
Figure 8Q:
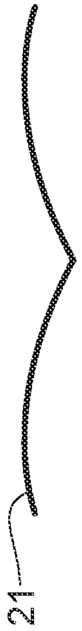
Figure 8A:
Figure 8B:
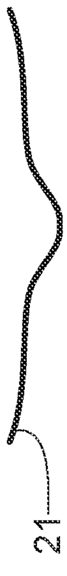
Figure 8C:
Figure 8D:
Figure 8E:
Figure 8F:
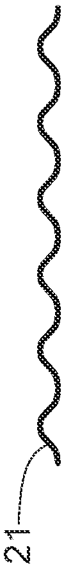
Figure 8G:
Figure 8H:
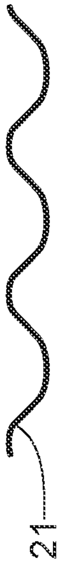
Figure 8I:

Still rereferring to FIGS. 3A-3C, the anvil block 16 may include an anvil bead 17. The anvil bead 17 may protrude from the first anvil block surface 38 away from the longitudinal cylinder axis 24. The anvil beads 17 present on each anvil block 16 may abut one another such that the anvil beads form a substantially continuous shape along the cylinder 12. Each individual anvil bead 17 may be shaped and the plurality of anvil beads 17 may form any shape along the cylinder that is desired to be imparted to the web 14. It is to be appreciated that the shape of each individual anvil bead may be the same or different. For example, the anvil beads may form a sinusoidal shape or a saw-tooth shape. FIG. 8A-8Q illustrates various shapes the plurality of anvil beads may form. The shape of the anvil beads is the same as or similar to the shape imparted to the web 14 as a line of weakness 21. In some embodiments, for example the anvil beads may form a sinusoidal shape along the longitudinal cylinder axis such that the line of weakness imparted to the web has a wavelength of from about 0.75 inches to about 2.5 inches and an amplitude of from about 0.1 inches to about 1 inch. For example, a line of weakness having a wavelength of about 1.38 inches and an amplitude of about 0.236 inches may be manufactured by the disclosed process and apparatus and is within the above specified ranges.

It is to be appreciated that a shaped blade may be used in place of the anvil beads. It is also to be appreciated that to obtain a shaped line of weakness, the shaped element, such as the anvil beads or blades, should be present on the rotating device, such as the rotating cylinder. The same result does not occur if the shape is on the stationary, or non-rotating, device.

It is also to be appreciated that the anvil bead 17 and the anvil block 16 may be machined from the same material such that the anvil bead 17 is attached to the anvil block 16. The anvil bead 17 may also be removably connected to the anvil block 16 such that the anvil bead 17 is separate from the 16 when not connected. This allows for the anvil bead to be changed independent of the anvil block 16. For example, the shape of the anvil bead may be changed without changing the anvil block. The anvil bead may be switch from a non-linear, shaped anvil bead to a straight, linear anvil bead. The anvil block may also not contain any anvil bead. The cylinder may be operated without the anvil block having the anvil bead. This may be done to retain the surface profile of the cylinder but to have a particular anvil block not affect the traversing web.

Each anvil bead 17 may have an anvil bead height 44 measured from the first anvil block surface 38 to an anvil bead tip 46. The anvil bead height 44 may be from about 0.01 inches to about 0.40 inches, including all 0.01 inches therebetween. The anvil bead height 44 in combination with the anvil block height 40 allow for control of the debris from the manufacturing process. For example, in some embodiments, the height from the outer circumferential surface 30 to the anvil bead tip 46 is from about 0.02 inches to about 0.8 inches and/or from about 0.1 inches to about 0.6 inches and/or from about 0.2 inches to about 0.45 inches, including all 0.01 inch increments between the recited ranges. The combination of these heights generally results in the cavity 42. The design of the surface of the cylinder 12 including the anvil block 16 and anvil bead 17 causes the air to flow over the anvil bead and into the cavity 42. The debris from the web 14 perforation process and/or upstream processes is then caught in this air stream and flows into the cavity 42 and away from the web 14.

Figure 4:
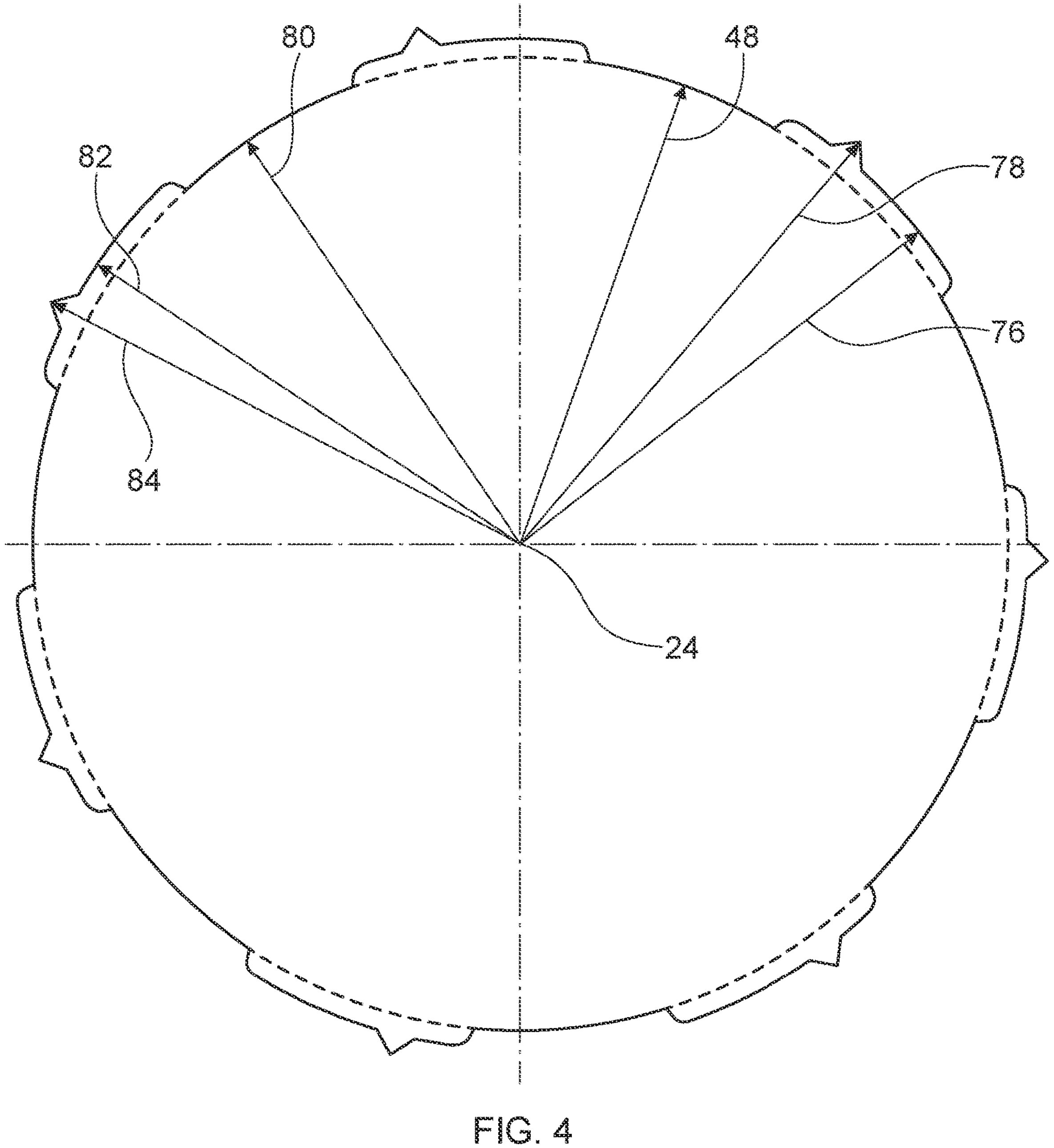
FIG. 4 is an end view of a cylinder including an anvil block and an anvil bead in accordance with one non-limiting embodiment of the present disclosure.

More specifically, the difference in the diameters of the cylinder 12 including the anvil blocks 16 and anvil beads 17 aids in controlling the air flow and thus the debris from the perforating process. The difference in diameter or radii of the cylinder 12, anvil block 16 and anvil beads 17 determines, in part, the characteristics, such as the depth, of the cavity 42, which is used to control the debris generated in the perforating process and/or upstream processes. As illustrated in FIG. 4, the cylinder 12 may include a cylinder diameter 48 measured from the outer circumferential surface 30. The anvil block 16 may include an anvil block diameter 76 measured from the first anvil block surface 38 to the outer circumferential surface 30. Similarly, the anvil bead 17 may include an anvil bead diameter 78 measured from the anvil bead tip 46 to the outer circumferential surface 30. The difference of the cylinder diameter and the anvil block diameter may be from about 0.3 inches to about 1.2 inches. The difference of the cylinder diameter and the anvil bead diameter may be from about 0.4 inches to about 1.7 inches, and the difference of the anvil block diameter and the anvil bead diameter may be from about 0.2 inches to about 0.6 inches. Having the cylinder 12 designed such that the difference in diameters of the cylinder, anvil block, and anvil bead are as previously disclosed, the debris may be directed away from the web 14 and into the cavity 42. In some embodiments, the anvil bead diameter may be from about 8 inches to about 20 inches and/or from about 11 inches to about 15 inches; the anvil block diameter may be from about 7 inches to about 18 inches and/or from about 10 inches to about 15 inches; and the cylinder diameter may be from about 5 inches to about 16 inches and/or from about 8 inches to about 10 inches. It is to be appreciated that all 0.01 increments are included between the aforementioned recited ranges.

As previously stated, the ability to control the debris from the perforating process and/or upstream processes may also be obtained by having the appropriate comparison of radii of the cylinder 12, anvil block 16, and anvil bead 17. For example, as illustrated in FIG. 4, the cylinder 12 may include a cylinder radius 80 measured from the longitudinal cylinder axis 24 to the outer circumferential surface 30. The anvil block 16 may include an anvil block radius 82 measured from the first anvil block surface 38 to the longitudinal cylinder axis 24. Similarly, the anvil bead 17 may include an anvil bead radius 84 measured from the anvil bead tip 46 to the longitudinal cylinder axis 24. The difference of the cylinder radius and the anvil block radius may be from about 0.15 inches to about 0.6 inches. The difference of the cylinder radius and the anvil bead radius may be from about 0.2 inches to about 0.85 inches, and the difference of the anvil block radius and the anvil bead radius may be from about 0.1 inches to about 0.3 inches. Having the cylinder 12 designed such that the difference in radii of the cylinder, anvil block, and anvil bead are as previously disclosed, the debris may be directed away from the web 14 and into the cavity 42.

Prior cylinder and anvil designs have failed to address the need to run at relatively high manufacturing speeds and to control the debris generated from the shaped perforation process and/or upstream processes. Prior designs are unable to obtain desired manufacturing run times due to, for example, premature breaking of web. The web is prone to failure when the debris is allowed to flow back towards the web and ultimately get captured on the web and interfere with the perforating process. The design described herein allows for sustained manufacturing run times and control of the debris in the process such that the debris generally moves away from the web and does not negatively impact the perforating process or other downstream processes.

Due to the relatively high manufacturing speeds, the anvil beads may be helically angled along the longitudinal cylinder axis, as illustrated in FIG. 3A. Each anvil bead may have a helix angle $\alpha$ measured from the longitudinal cylinder axis 24. The helix angle $\alpha$ may be from about 1 degrees to about 10 degrees and/or from about 2 degrees to about 8 degrees and/or from about 4 degrees to about 6 degrees, including all 0.1 degree increments between the recited ranges. The helix angle of the anvil beads may be determined, in part, due to the number of anvil blocks positioned about the circumference of the outer circumferential surface of the cylinder. The helix angle aids in minimizing vibration in the apparatus by maintaining contact points along the blade during processing. The helix angle may be increased or decreased to maintain a certain number of contact points between the blade and the anvil bead. For example, the helix and shape of the anvil bead may provide for from about 4 to about 10 contact points between the anvil bead and the blade. For example, the blade 26 may engage the helically mounted anvil bead such that the perforations 22 are created by a consecutive series of interaction points across the web 14 in a zipper-like manner. Further, helically mounting the anvil 16 may allow the anvil 16 to be in constant engagement with the blade 26.

The helix angle of the anvil beads also allows for the web 14 to be processed at relatively high manufacturing speeds, such as where the web traverses at a speed of from about 300 m/min to about 900 m/min and/or from about 500 m/min to about 750 m/min, including all 0.1 m/min increments between the recited ranges. As the web 14 is impacted by the helically angled anvil bead, the anvil bead imparts a shaped line of weakness that is substantially parallel to the cross direction CD. It is to be appreciated that the speed of the web and/or the anvil bead may be adjusted to change the direction and other properties of the lines of weakness. The speed of the anvil bead may be set with respect to the speed of the traversing web. The anvil bead may rotate at an overspeed of up to about 50% of the speed of the traversing web. The anvil bead may also be rotated at an underspeed with respect to the traversing web or at a substantially matched speed to the traversing web.

Further, the anvil bead 17 may be made from the same material as the anvil block 16 and/or the cylinder 12 or a different material. The anvil bead 17 may be made from a material that provides sufficient rigidity and life, strength and wear resistance, such that the anvil bead does not deflect or deflects minimally when engaging the blade and can sustain relatively prolonged manufacturing run time. The anvil bead 17 may be made from metal such as steel, aluminum, or tungsten carbide. The anvil bead 17 may also be made from non-metal such as ceramic, carbon fiber, or hard plastic. It is also to be appreciated that the anvil bead 17 may be made from two different materials. For example, the anvil bead body made be made from a first material and the anvil bead tip may be coated with a second material that is different than the first material. The second material may be applied by known methods such as laser cladding. As previously discussed, the anvil bead 17 operatively engages the blade 26. Thus, the anvil bead 17 should be made of a material that withstands continuous contact and wears advantageously for the perforating process. For example, the wear profile of the anvil bead may impact the quality of the perforation and, thus, the line of weakness imparted to the web 14. A material should be selected that allows for slow wear and a wear profile that does not negatively impact the line of weakness.

The anvil bead 17 may have an anvil bead cross sectional shape. The shape of the anvil bead may be such that the anvil bead is able to interact with the blade 26 to create lines of weakness. For example, the anvil bead may have a cross section shape that is substantially triangular shape or trapezoidal shape. The anvil bead may have a cross sectional angle $\beta$ of from about 50 degrees to about 120 degrees and/or from about 70 degrees to about 100 degrees and/or from about 80 degrees to about 90 degrees, including all 0.1 degrees between each of the recited ranges. It is to be appreciated that the shape of the anvil bead may change as the anvil bead wears due to contact with the blade 26.

Figure 5A:
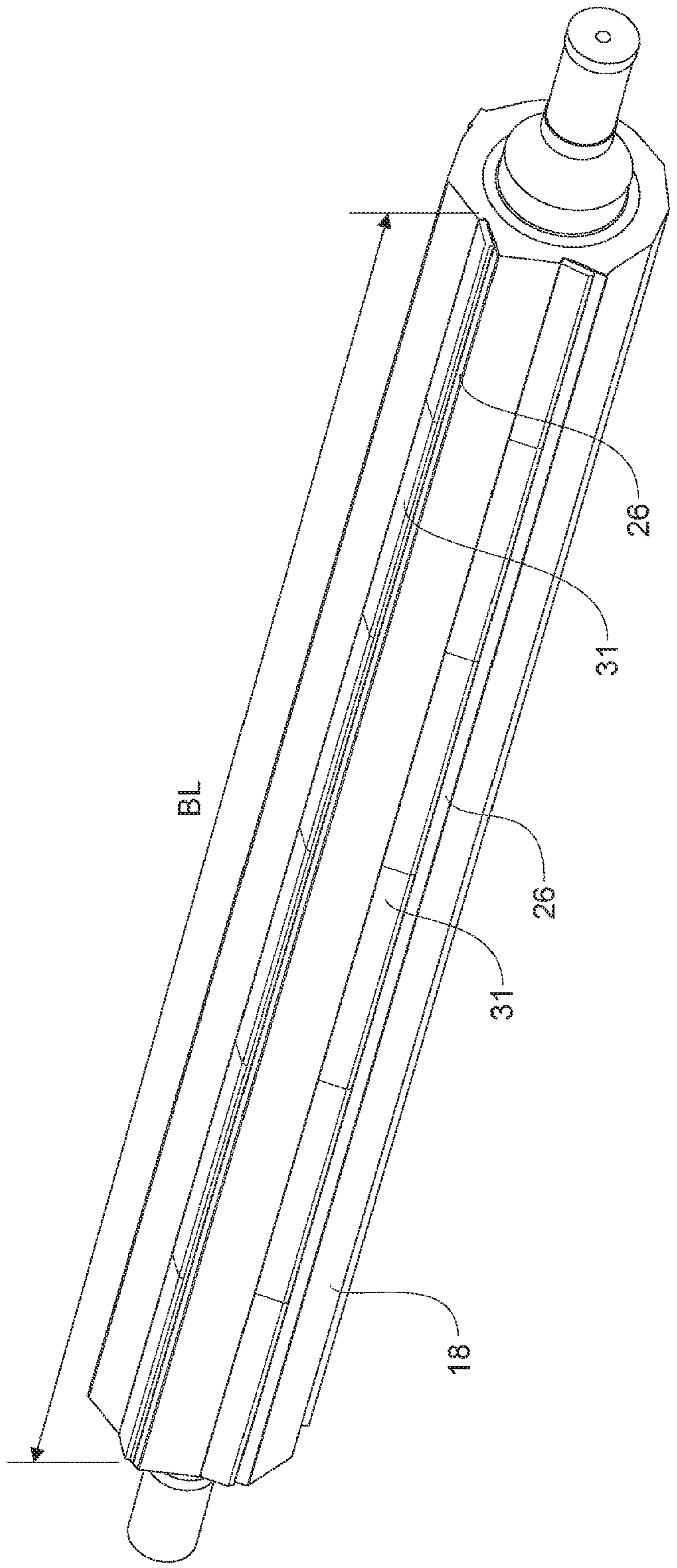
FIG. 5A is a perspective view of a support including a blade in accordance with one non-limiting embodiment of the present disclosure.
Figure 5B:
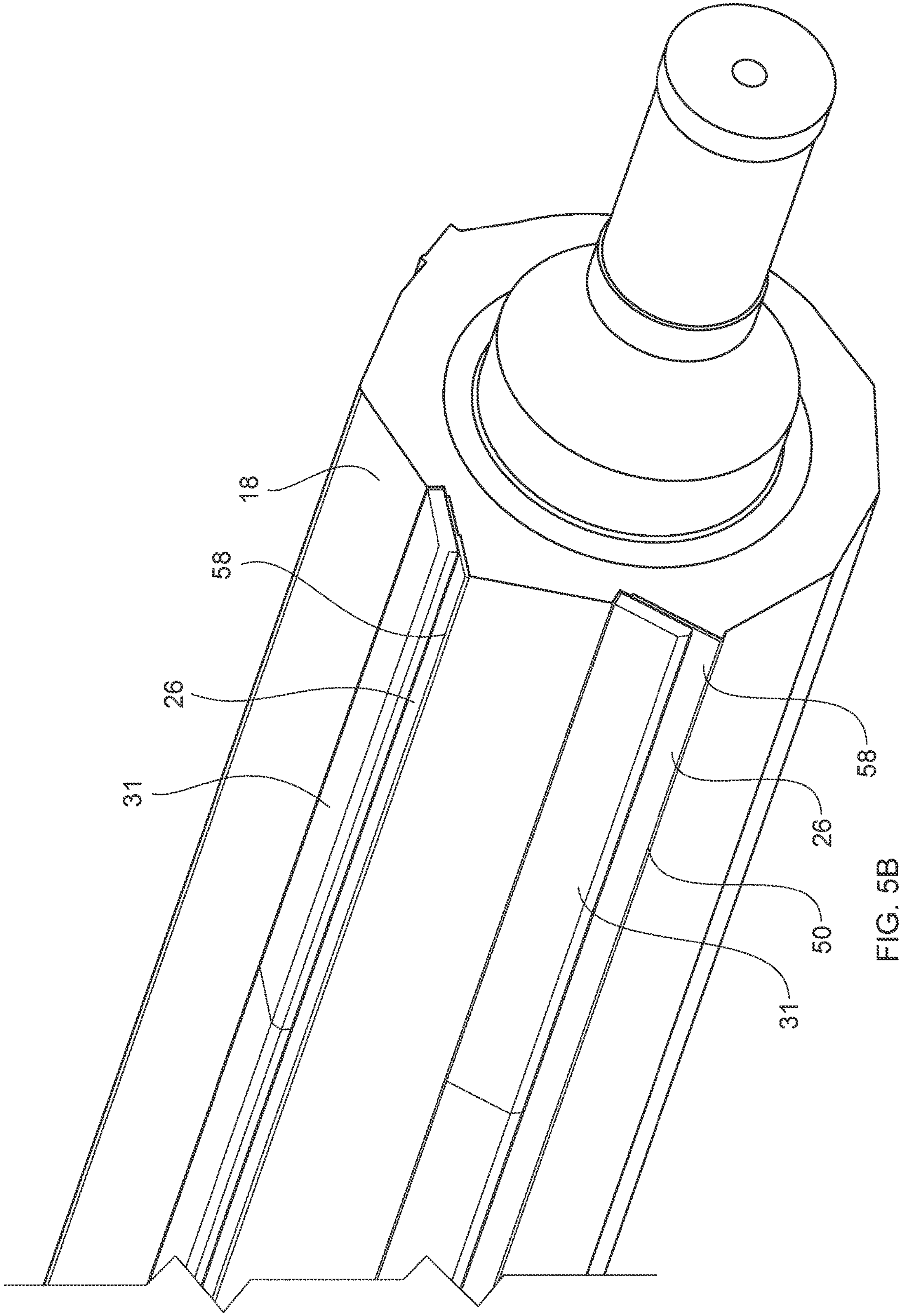
FIG. 5B is a partial perspective view of a support including a blade in accordance with one non-limiting embodiment of the present disclosure.

Referring to FIGS. 5A and 5B, the support 18 may be positioned adjacent the cylinder 12. The support 18 may be formed from metal, such as steel or a steel alloy, or from some other material as would be known to those skilled in the art to be suitable as a structural support of perforating equipment. The support 18 may be in a block shape, a cylindrical shape, or another shape that would adequately support a blade 26. The support 18 may be placed in a fixed, non-moveable, non-rotatable position during contacting relationship with the anvil bead 17, independent of the shape of the support 18. In one example embodiment, the support 18 may be a cylindrical shape or a substantially square shape such that when one or more blades 26 disposed on the outer surface wear or break, the support 18 may be rotated and fixed in a position so that a new blade 26 may be placed in contacting relationship with the anvil 16. Alternatively, the support 18 may be rotated and/or adjusted in and out of contacting relationship with the anvil 16 to easily and readily replace worn or damaged blades 26. A support 18 include more than one blade may also allow for various types of blades, such as blades having teeth with different spacing, to be quickly and easily placed into and out of operation.

The support 18 may include one or more blades 26 configured to operate in contacting engagement with the anvil bead 17. In some embodiments, the blade 26 interacts with the anvil bead in a shearing action. A portion of the blade 26 may be supported by the support 18 and another portion of the blade may be supported by a clamp 31. The clamp 31 and the support 18 act to hold the blade 26 in position, such that a portion of the blade 26 extends outward from the support 18 and is exposed for contact with the anvil bead. The blade may be held between the clamp 31 and the support such that the blade 26 may deflect during operative engagement with the anvil bead 17. This may be referred to as a flex-rigid configuration. This deflection and the inherent flexibility of the blade 26 allows for improved perforation reliability by being more forgiving to slight differences in machine tolerances. The support 18 may include a recessed portion, such that a portion of the support 18 is positioned under the blade 26 or opposite the first blade surface 58 but does not contact the blade 26 when the blade is inoperable. The portion of the support 18 disposed under the blade 26 but not contacting the blade 26, may be used to ensure that the blade does not deflect too much and/or to aid avoiding breaking the blade. The clamp 31 may be removably connected to the blade 26 and/or the support 18. This allows for timely replacement of worn and/or damaged blades. The blade 26 also extends in a direction substantially parallel to the longitudinal cylinder axis 24 or the cross direction CD. The blade 26 may have a total blade length BL that generally is as long as or longer than the width of the web such that the line of weakness extends from the first edge to the second edge of the web. The blade 26 may be a single blade or may include a plurality of blade segments.

The blade may be made from metal such as steel, tungsten, or any other hardened material that may withstand continued engagement with the anvil. The blade 26 may include a number of teeth extending along the total blade length. The spacing and number of teeth may be determined based on the desired number of perforations 22 and characteristics of the line of weakness in the web 14, such as disclosed in US Patent Publication Nos. 2014/0366695; 2014/0366702; and 2014/0370224. The tooth may be equally spaced along the total blade length or the teeth may be spaced at various increments along the total blade length.

The blade 26 may be configured to oscillate in the cross direction CD and/or substantially parallel to the longitudinal cylinder axis 24 during the perforation process. The blade 26 oscillates by moving a first direction, substantially parallel to the cross direction, by a predetermined amount and, subsequently, moving in a second direction, opposite the first direction by another predetermined amount. The blade 26 may oscillate by the same distance in both the first direction and the second direction, or the blade may oscillate by a different distance in the first direction and the second direction. The predetermined amount the blade may oscillate may depend, in part, on the shape of the line of weakness that is to be imparted to the web and/or the shape of the anvil bead. For example, the shape of the anvil beads may include a pattern that repeats a number of times along the central longitudinal axis. Each of these repeat patterns may include an axial distance. The axial distance is the distance from the end of a preceding pattern or the beginning of a new pattern to the beginning of the subsequent pattern or the end of the pattern. The oscillation of the blade may depend on this axial distance. The blade may oscillate a predetermined distance of from about 1% to greater than about 100% of the axial distance. For example, for a sinusoidal wave pattern having an axial distance or wavelength of 1.23 inches, the blade may oscillate from about 0.1 inches to about 0.23 inches in the cross direction CD. The oscillation of the blade 26 aids in reducing wear on the blade during processing and allows for the blade to wear more uniformly than if the blade was kept stationary. An example of an oscillating blade is disclosed in US Patent Publication Nos. 2016/0271820; 2016/0271823; and 2016/0271824.

Figure 6A:
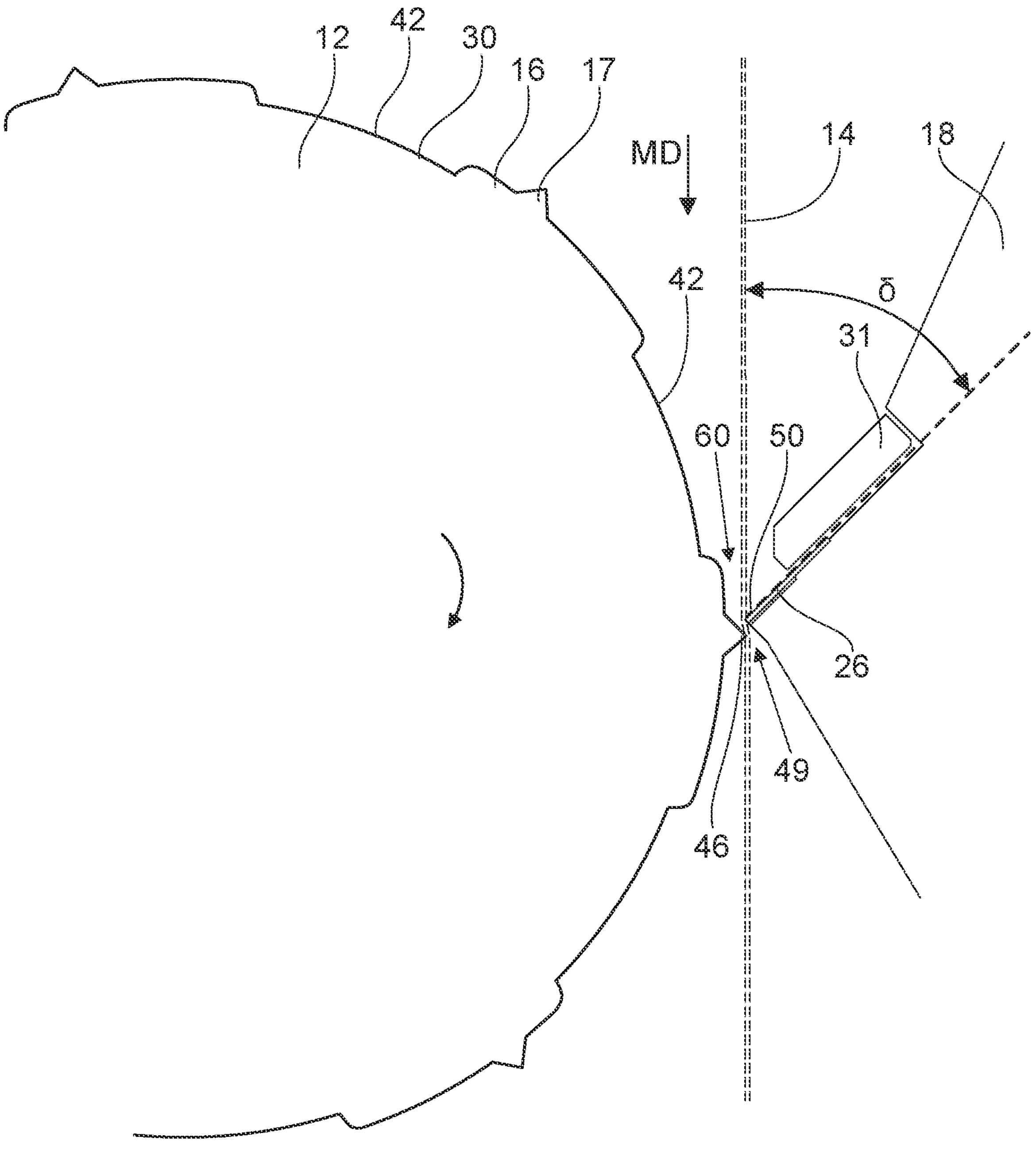
FIG. 6A is a partial side view of a cylinder and a support and a web traversing therebetween in accordance with one non-limiting embodiment of the present disclosure.
Figure 6B:
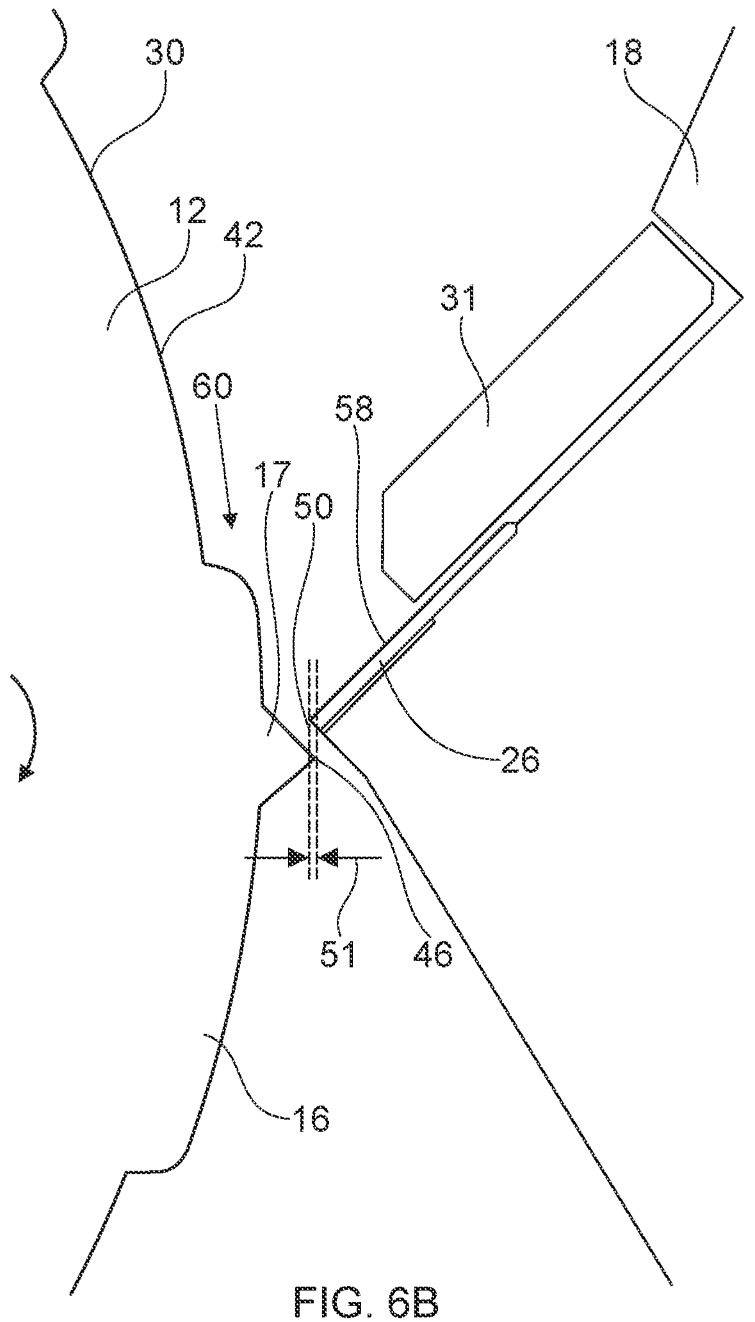
FIG. 6B is a partial side view of a cylinder and a support in accordance with one non-limiting embodiment of the present disclosure.

As illustrated in FIGS. 6A and 6B, the web 14 traverses between the blade 26 and the anvil bead 17. As previously discussed, the anvil bead 17 and the blade 26 operate in contacting relationship to perforate the traversing web 14. The point at which the anvil bead 17 contacts the blade 26 is the nip 49. More specifically, the cylinder 12 rotates about the longitudinal cylinder axis 24 resulting in the anvil block 16 and the anvil bead 17 also rotating about the longitudinal cylinder axis 24. The blade 26 is positioned such that a tip of blade, the blade tip 50, overlaps the anvil bead tip 46 by an overlap distance 51, as illustrated in FIG. 6B. The overlap distance 51 is measured from the blade tip 50 to the anvil bead tip 46 in a direction substantially parallel to the cross direction. The overlap distance 51 may be from about 0.002 inches to about 0.3 inches. If the overlap distance becomes too small and the blade 26 fails to operatively engage the anvil bead 17, the web 14 is not adequately perforated and the resulting characteristics of the line of weakness are likely to be unacceptable from both a manufacturing standpoint and from a consumer acceptance/use standpoint. By decreasing the overlap distance between the blade 26 and the anvil bead 17, the perforations 22 generally become less pronounced, less visible, shorter, and the unperforated regions 23 generally become wider and thus stronger. If the overlap distance becomes too large such that the blade 26 and the anvil bead 17 have a significant overlap, the web 14 may be unable to traverse through the nip and the web 14 may be separated such that the line of weakness fails during processing and the web splits along the line of weakness or adjacent to the line of weakness. By increasing the overlap between the blade 26 and the anvil bead 17, the perforations 22 generally become more pronounced, more visible, and longer. Maintaining the overlap distance as previously specified and avoiding too much or too little overlap, allows the web 14 to be perforated and a line of weakness to be formed such that the line of weakness is preserved during processing and yet provides ease of use to consumers. The overlap distance may be adjusted, for example, by moving one of the bade 26, the cylinder 12, and/or the support 18.

As illustrated in FIG. 1, the web 14 includes a longitudinal web axis 52, a first side edge 54, and a second side edge 56 opposite the first side edge 54. The web 14 traverses between the blade 26 and the anvil bead 17 such that the longitudinal web axis 52 is substantially parallel to the machine direction or, stated another way, the longitudinal web axis 52 is substantially tangential to the outer circumferential surface 30 of the cylinder 12, as illustrated in FIG. 6A. Further, in some embodiments, the blade 26 may be positioned with respect to the traversing web 14. More specifically, the blade 26 incudes a blade tip 50 and a first blade surface 58. The first blade surface 58 may be exposed such that the anvil bead operatively engages a portion of the first blade surface 58 and the blade tip 50. The blade 26 is positioned such that the blade tip 50 and blade surface 58 is at a blade angle δ. The blade angle δ is measured from the blade to the surface of the traversing web 14 or a plane that is parallel to the machine direction MD. The blade angle δ is from about 20 degrees to about 60 degrees and/or from about 30 degrees to about 55 degrees and/or from about 45 degrees to about 50 degrees, including all 0.1 degree increments between the recited ranges.

As illustrated in FIGS. 6A and 6B, due to the position of the blade 26 and the profile of the cylinder including the anvil block and anvil bead, the traversing web 14 has a relatively larger gap 60 than previous designs through which the web traverses. Further, the anvil bead height 44 also provides added clearance in the gap 60. This gap 60 allows for imperfections in the web 14 to traverse between the anvil bead and the blade without causing failure in the web 14, such as a tear. For example, the web 14 may comprise a large deposit of pulp in a particular area. This build-up of pulp causes the web 14 to be thicker in this area. The increased thickness may be unnoticeable to a consumer and may not adversely affect the finished product. However, the increased thickness may result in manufacturing issues. These issues are relatively avoided for the perforating process due to the relatively larger gap 60 between the blade 26 and the anvil bead 17.

It is also to be appreciated that the gap 60 allows for strain on the web to be maintained during the manufacturing process. The traversing web 14 may be strained in the machine direction at a strain of from 0% to about 15% and/or from about 0.5% to about 10% and/or from about 3% to about 8%, including all 0.1% increments between the recited ranges. This strain needs to be maintained on the web 14 for downstream processing such as winding the web into a roll or separating the web along lines of weakness. The gap 60 present in the perforating apparatus allows for the strain on the web to be maintained during the perforating process. Past processes required the strain in the web to be reduced prior to traversing through the perforating operating because a portion of the web needed to be disposed on the cylinder during the perforating process for the process to create a line of weakness in the web. By contrast, the gap 60 and, thus, the position of the anvil bead 17 with respect to the blade 26 allows for sufficient clearance between the anvil bead 17 and the blade 26 such that the web may be perforated without additional strain being placed on the web such that the web breaks or tears.

The perforating apparatus previously described is configured to impart a shaped line of weakness onto a traversing web 14. The shaped line of weakness on the web 14 is due in part to the design of the anvil bead, the helix angle, and the speed of the web 14 with respect to the speed of the anvil bead 17. The web 14 may traverse at a web speed, as previously described. The anvil bead 14 may be rotated at a speed greater than, less than, or equal to the speed of the traversing web 14. The speed at which the web 14 and the anvil bead 14 traverse may change the characteristics of the line of weakness on the web 14. For example, the shape of the line of weakness may differ from the shape formed by the anvil beads. For a line of weakness having a sinusoidal shape, the wavelength and/or amplitude of the shaped line of weakness may be different than the wavelength and/or amplitude of the shape formed by the anvil beads. Further, the distance between adjacent lines of weakness on the web 14 may be changed based on the speed of the anvil beads and the traversing web. For example, the speed of the anvil bead may be greater than the speed of the web, oversped, to produce adjacent lines of weakness having a distance between adjacent lines of weakness that is reduced, as compared to having the anvil bead and the web traversing at the same speed. Similarly, the speed of the anvil bead may be less than the speed of the web, undersped, to produce adjacent lines of weakness having a distance between adjacent lines of weakness that is increased, as compared to having the anvil bead and the web traversing at the same speed.

Figure 7:
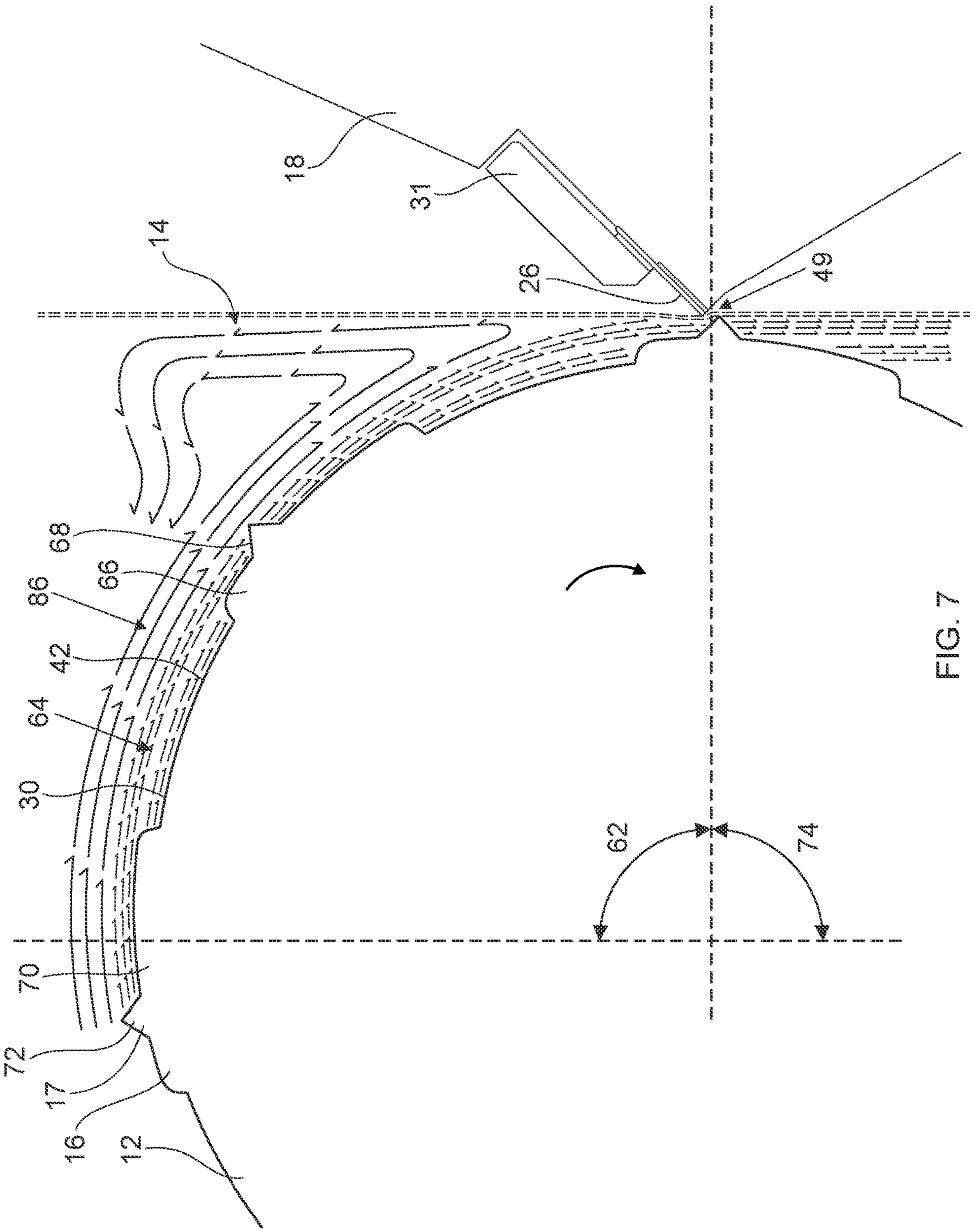
FIG. 7 is a partial side view of a cylinder and a support and the air flow during perforation of a web in accordance with one non-limiting embodiment of the present disclosure.

Referring to FIG. 7, as the anvil bead 17 interacts with the blade 26 to perforate the web 14, debris is generated from the perforating process and/or upstream processes. This debris may interfere with the perforating process and result in failure of the web 14 by tearing, incomplete perforations, and/or a line of weakness that is not consumer acceptable. As previously discussed, the cylinder 12, anvil block 16, and anvil bead 17 create a profile that controls the flow of the debris. As the cylinder 12 rotates about the longitudinal cylinder axis 24 air flows over the outer circumferential surface 30. The air flow is generally in the direction of rotation of the cylinder 12, as illustrated by the arrows in FIG. 7. This air flow is interrupted by the engagement of the anvil bead 17 with the blade 26 at the nip 49. This interruption causes the air flow to become turbulent and to carry the debris in an unpredictable pattern that may result in debris interfering with the perforating process and damaging the web 14. The design of the cylinder 12 including the anvil block 16 and the anvil bead 17 controls the air flow by creating a low pressure zone 86 in the wake of the anvil bead 17. This low pressure zone defines a boundary layer 64. The boundary layer 64 extends between radially positioned, adjacent anvil bead tips 46. The low pressure zone 86 encourages the debris into the boundary layer 64. The boundary layer 64 is maintained as the cylinder traverses about the longitudinal cylinder axis and the debris is transferred into the cavity 42, as previously discussed. More specifically, the cylinder 12 may include a pre-perforation zone 62 which is the area of the cylinder prior to the web being perforated. The cavity 42 of the cylinder 12 in the per-perforating zone allows for more air to be controlled prior to perforating. The cavity 42 allows for a relatively greater quantity of air to be encouraged to stay adjacent to the outer circumferential surface 30 of the cylinder 12, within the boundary layer 64. The debris is controlled such that the debris flows into the cavity and/or adjacent the outer circumferential surface and thus, the debris that interferes with the web and/or the perforation process is minimized. The debris is controlled such that the web and the line of weakness are not adversely impacted. Thus, in the perforation zone, the debris is generally channeled toward the outer circumferential surface 30 and into the cavity 42 and away from the web 14.

The boundary layer 64 of air flow may be present between adjacent anvil beads spaced radially about the outer circumferential surface. This boundary layer 64 of air flow may be present over the cavity defined by the cylinder, anvil blocks, and anvil beads. For example, a boundary layer 64 is formed between a first anvil bead 68 and a radially adjacent second anvil bead 72. The boundary layer encompasses the cavity 42 between the first anvil block 66 and the second anvil block 70. A web 14 traverses through the nip and the first anvil block 66 and the second anvil block 70 traverse in the per-perforation zone 62. The boundary layer 64 is formed as the first anvil bead 68 and the second anvil bead 72 traverse about the longitudinal cylinder axis. Debris is formed by perforating the web 14. The debris is encouraged to travel away from the web and into the boundary layer 64 via the low pressure zone created on the wake of the anvil bead. The debris is then contained within the boundary layer 64 and the cavity 42. The debris is held in this area between the first and second anvil beads and the cavity, until the boundary layer 64 is broken. The boundary layer begins to be broken when the first anvil bead 68 engages the blade 26 at the nip 49. The boundary layer generally gets broken by the disruption in air flow caused by the operative engagement of the anvil bead and the blade. The boundary layer remains effective in the pre-perforation zone until the second anvil bead 72 contacts the blade 26. The first anvil block and bead traverse into the post-perforation zone 74 and the second anvil block 70 and second anvil bead 72 continue to traverse and the second anvil bead 72 operatively engage the blade 26. At this point, the boundary layer is fully broken. Due to the broken boundary layer and centrifugal force, the debris is expelled from the area between the first anvil bead and the second anvil bead and the cavity and falls away from the outer circumferential surface 30 of the cylinder 12. The debris is expelled in the post-perforation zone 74. Thus, the design of the cylinder, anvil blocks, and anvil beads allows for sustained continuous manufacturing time and to produce a final product having its intended properties due, in part, to the control of debris.

After exiting the perforation apparatus, the web 14 may traverse to other downstream processes, such as winding, cutting, and sealing.

The process for perforating the web includes rotating the cylinder 12 about the longitudinal cylinder axis 24. The cylinder 12 includes an outer circumferential surface 30 that substantially surrounds the longitudinal cylinder axis 24. The outer circumferential surface 30 includes a plurality of recessed portions 36. These recessed portions 36 may be positioned both longitudinally and radially about the outer circumferential surface 30. The recessed portions 36 are configured to accept an anvil block 16 or two or more anvil block segments. The anvil blocks 16 may be removably connected with the recessed portions 36. The anvil blocks 16 may be offset from one another in the longitudinal direction. Further, the anvil blocks may be positioned radially about the outer circumferential surface 30 and cavities are formed between adjacent anvil blocks. These cavities 42 are formed by the anvil blocks 16 extending radially above the outer circumferential surface 30 of the cylinder 12. Each of the anvil blocks 16 may include an anvil bead 17. The anvil bead 16 may be removably connected to the anvil block 16 or the anvil bead 16 and the anvil block 17 may be manufactured together. The anvil beads 16 together form a shape extending along the longitudinal cylinder axis 24. The anvil beads operatively engage the blade 26. The blade 26 may be supported by a support 18. The blade may include a single blade or a plurality of blades. The blade 26 may be stationary or the blade 26 may oscillate in a direction substantially parallel to the cross direction. The web 14 is fed between the anvil bead 17 and the blade 26 to form perforations. The perforations imparted to the web 14 form a shaped line of weakness. However, debris is generated from perforating the web and/or upstream processes. This debris is controlled due to the shape of the cylinder in combination with the anvil block and the anvil bead. As previously discussed, a cavity is formed between adjacent anvil blocks, including anvil beads. Due to the air flow created by the cavity, the debris is drawn into the cavity and away from the web. This substantially minimizes any adverse effect the debris may have on the web and/or the perforating process. The debris is held in the cavity until the cavity is rotated to a position downstream of the nip, where the anvil bead engages the blade. Once the cavity is downstream of the nip, the debris may be expelled from the cavity and any other debris may be pushed away from the outer circumferential surface 30 of the cylinder 12. Due to the aforementioned process, the strain on the web is maintained. The machine direction strain may be from about 0.5% to about 10%. Further, the web may traverse through the nip at a web speed from about 300 m/min to about 900 m/min and/or from about 500 m/min to about 700 m/min, including all 0.1 increments between the recited ranges. The anvil bead rotates at an anvil bead speed greater than, less than, or equal to the web speed.

Is it also to be appreciated that the above description applies to either of the recited configurations. In some embodiments, the cylinder 12 may comprise a shaped blade 26 and the support 18 may comprise a straight, linear anvil bead 17, not shown. Likewise, in some embodiments, the cylinder 12 may comprise a shaped blade 26 and the support 18 may comprise a straight, linear blade.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of perforating a web, the method comprising:

rotating a cylinder about a longitudinal cylinder axis, the cylinder comprising an outer circumferential surface, wherein the outer circumferential surface defines a plurality of recessed portions, wherein a plurality of anvil blocks are positioned within the plurality of recessed portions, wherein the plurality of anvil blocks are radially disposed about the outer circumferential surface and define cavities therebetween, and wherein each of the plurality of anvil blocks comprise an anvil bead;

operatively engaging a blade with the anvil beads, wherein the blade is substantially parallel to the longitudinal cylinder axis, and wherein at least one of the blade and the anvil comprise a plurality of teeth;

feeding a web between the cylinder and the blade while the blade cooperates in contacting relationship with the anvil bead;

perforating the web to form a shaped line of weakness;

generating debris from perforating the web;

controlling the debris such that the debris is drawn into the cavities between the anvil blocks and away from the web;

expelling the debris from the cavities of the rotating cylinder, wherein the cylinder comprises a cylinder diameter, wherein the anvil block comprises an anvil block surface, the anvil block surface having an anvil block diameter, wherein the anvil bead comprises an anvil bead tip, the anvil bead tip having an anvil bead diameter, wherein the difference of the cylinder diameter and a diameter of an outer boundary circumferential surfaces of the anvil blocks is from 0.6 inches to 0.8 inches, and wherein the difference of a diameter of an outer boundary circumferential anvil beads and the diameter of the outer boundary circumferential surfaces of the anvil blocks is from 0.2 inches to 0.4 inches, wherein the difference of the anvil bead diameter and the anvil block diameter is from 0.2 inches to 0.4 inches.

2. The method of claim 1, wherein the anvil blocks are helically mounted on the rotating cylinder at an angle of 1 degrees to 10 degrees to the longitudinal cylinder axis.

3. The method of claim 1, wherein the anvil blocks are removably attached to an outer surface of the cylinder.

4. The method of claim 1, wherein the anvil block comprises one or more anvil segments.

5. The method of claim 1, wherein the web is at least one of bath tissue and towel tissue.

6. The method of claim 1, wherein the web comprises a longitudinal web axis, wherein the longitudinal web axis is tangential to the outer circumferential surface of the cylinder.

7. A method of perforating a web, the method comprising:

rotating a cylinder about a longitudinal cylinder axis, the cylinder comprising an outer circumferential surface, wherein the outer circumferential surface defines a plurality of recessed portions, wherein a plurality of anvil blocks are positioned within the plurality of recessed portions, wherein the plurality of anvil blocks are radially disposed about the outer circumferential surface and define cavities therebetween, and wherein each of the plurality of anvil blocks comprise an anvil bead;

operatively engaging a blade with the anvil beads, wherein the blade is substantially parallel to the longitudinal cylinder axis, and wherein at least one of the blade and the anvil comprise a plurality of teeth;

feeding a web between the cylinder and the blade while the blade cooperates in contacting relationship with the anvil bead;

perforating the web to form a shaped line of weakness;

generating debris from perforating the web;

controlling the debris such that the debris is drawn into the cavities between the anvil blocks and away from the web;

expelling the debris from the cavities of the rotating cylinder, wherein the cylinder comprises a cylinder diameter, wherein the anvil block comprises an anvil block surface, the anvil block surface having an anvil block diameter, wherein the anvil bead comprises an anvil bead tip, the anvil bead tip having an anvil bead diameter, wherein the difference of the cylinder diameter and a diameter of an outer boundary circumferential anvil beads is from 0.6 inches to 1.2 inches, and wherein the difference of the diameter of the outer boundary circumferential anvil beads and a diameter of an outer boundary circumferential surfaces of the anvil blocks is from 0.2 inches to 0.4 inches.

8. The method of claim 7, wherein the anvil blocks are helically mounted on the rotating cylinder at an angle of 1 degrees to 10 degrees to the longitudinal cylinder axis.

9. The method of claim 7, wherein the anvil blocks are removably attached to an outer surface of the cylinder.

10. The method of claim 7, wherein the anvil block comprises one or more anvil segments.

11. The method of claim 7, wherein the web is at least one of bath tissue and towel tissue.

12. The method of claim 7, wherein the web comprises a longitudinal web axis, wherein the longitudinal web axis is tangential to the outer circumferential surface of the cylinder.

* * * * *